Figure 1:
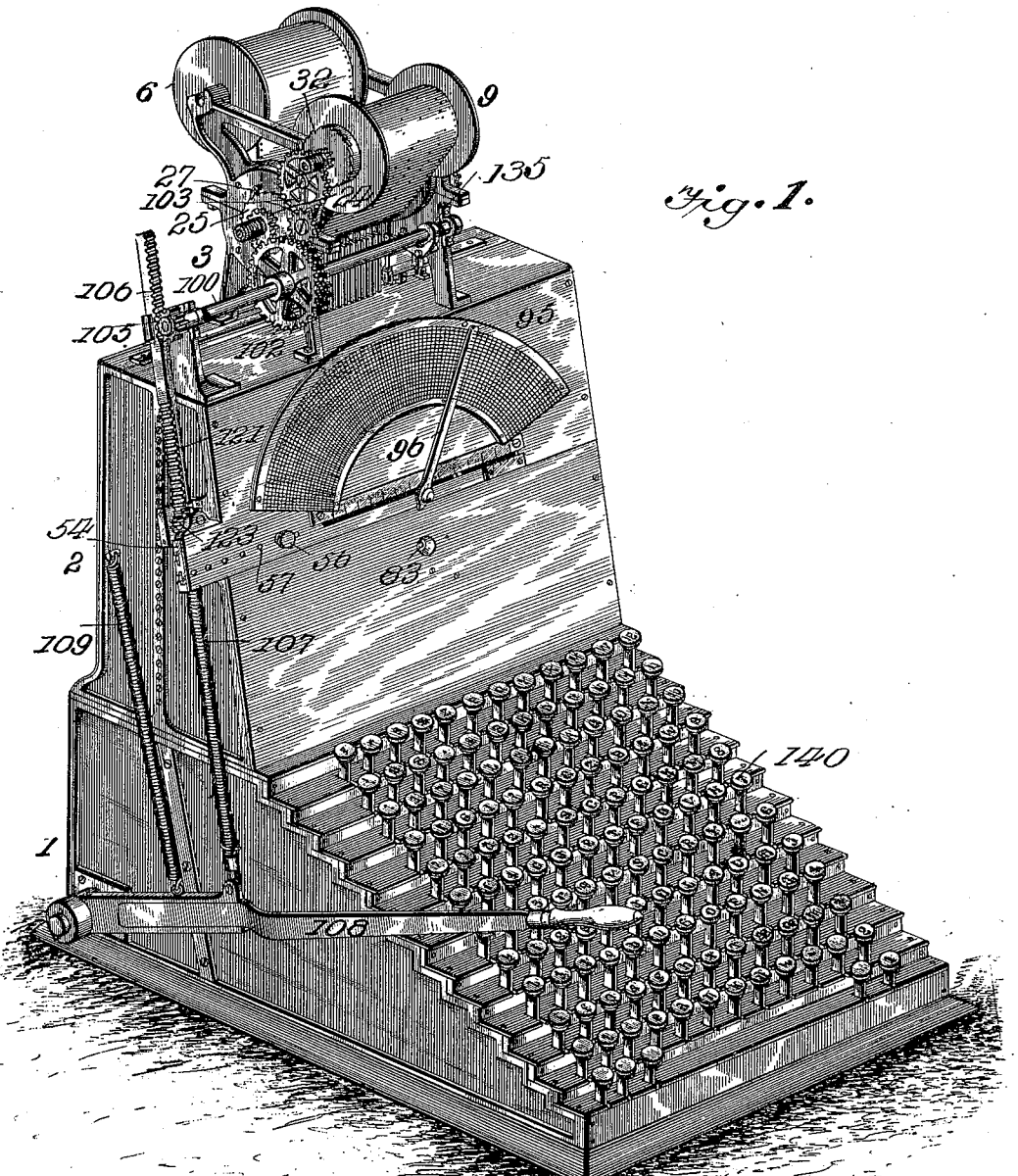

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 1.

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 2.

Witnesses
Inventor

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 3.

Paper Feed

Witnesses Inventor

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 4.
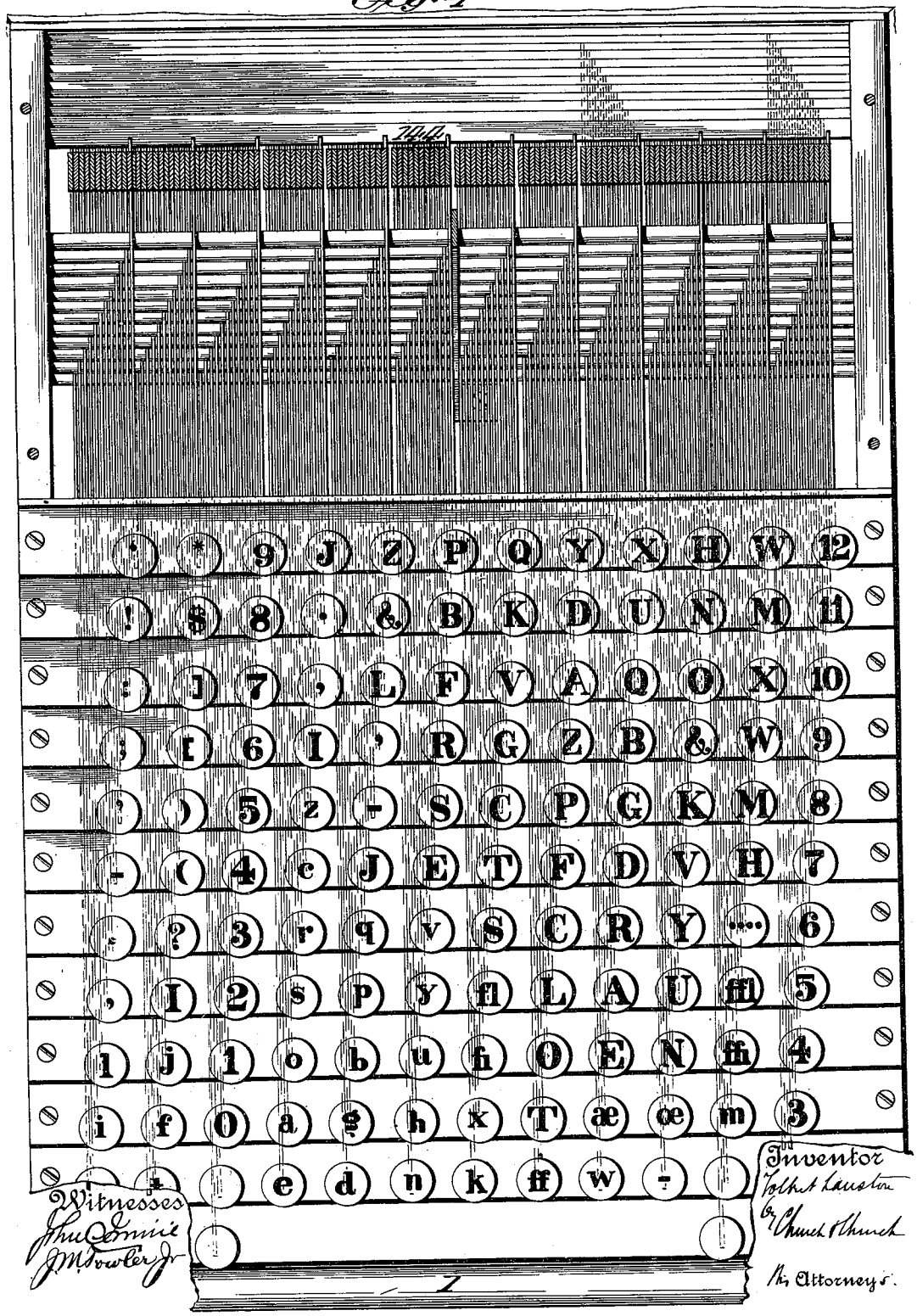

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 5.
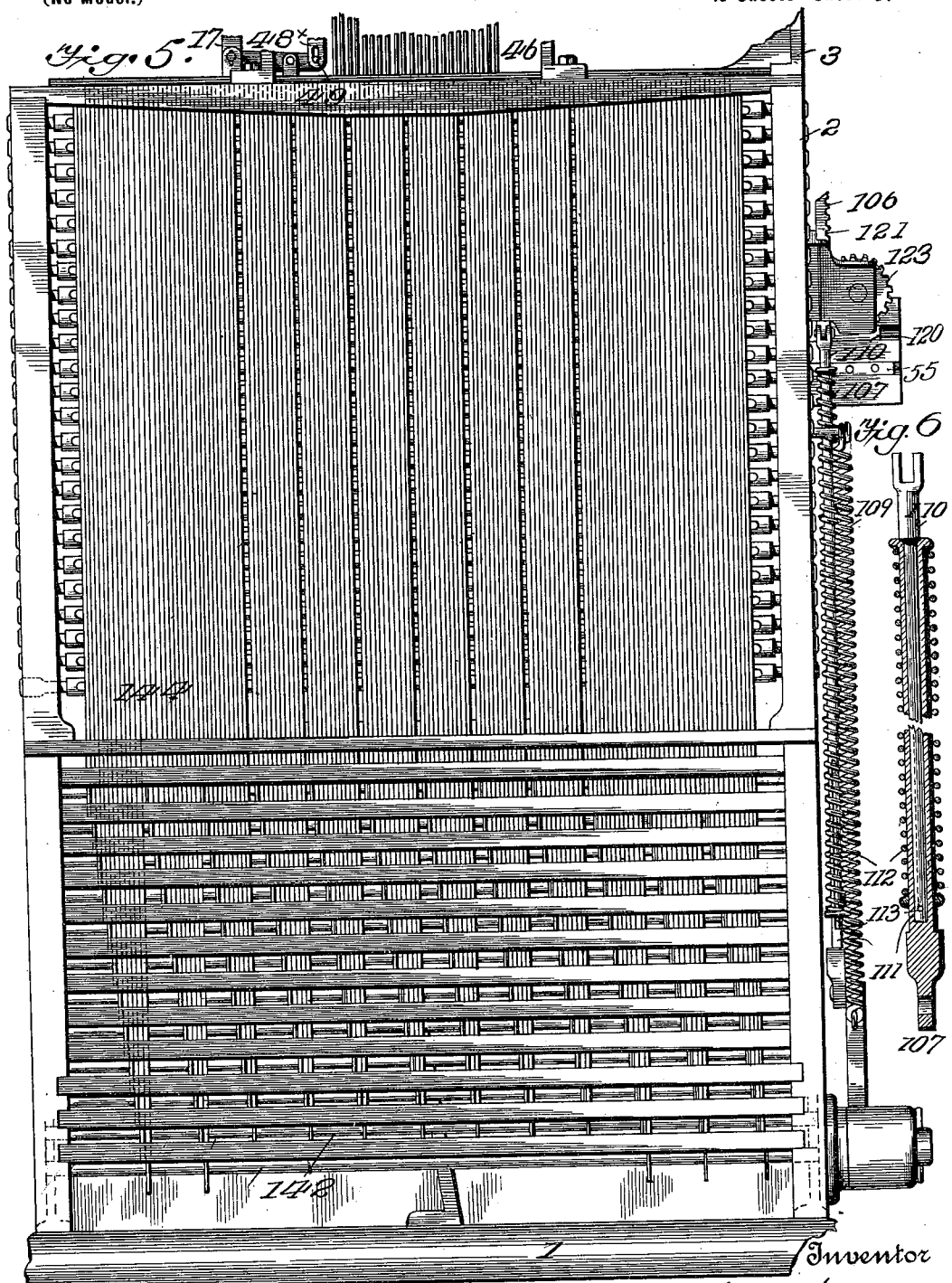

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 6.
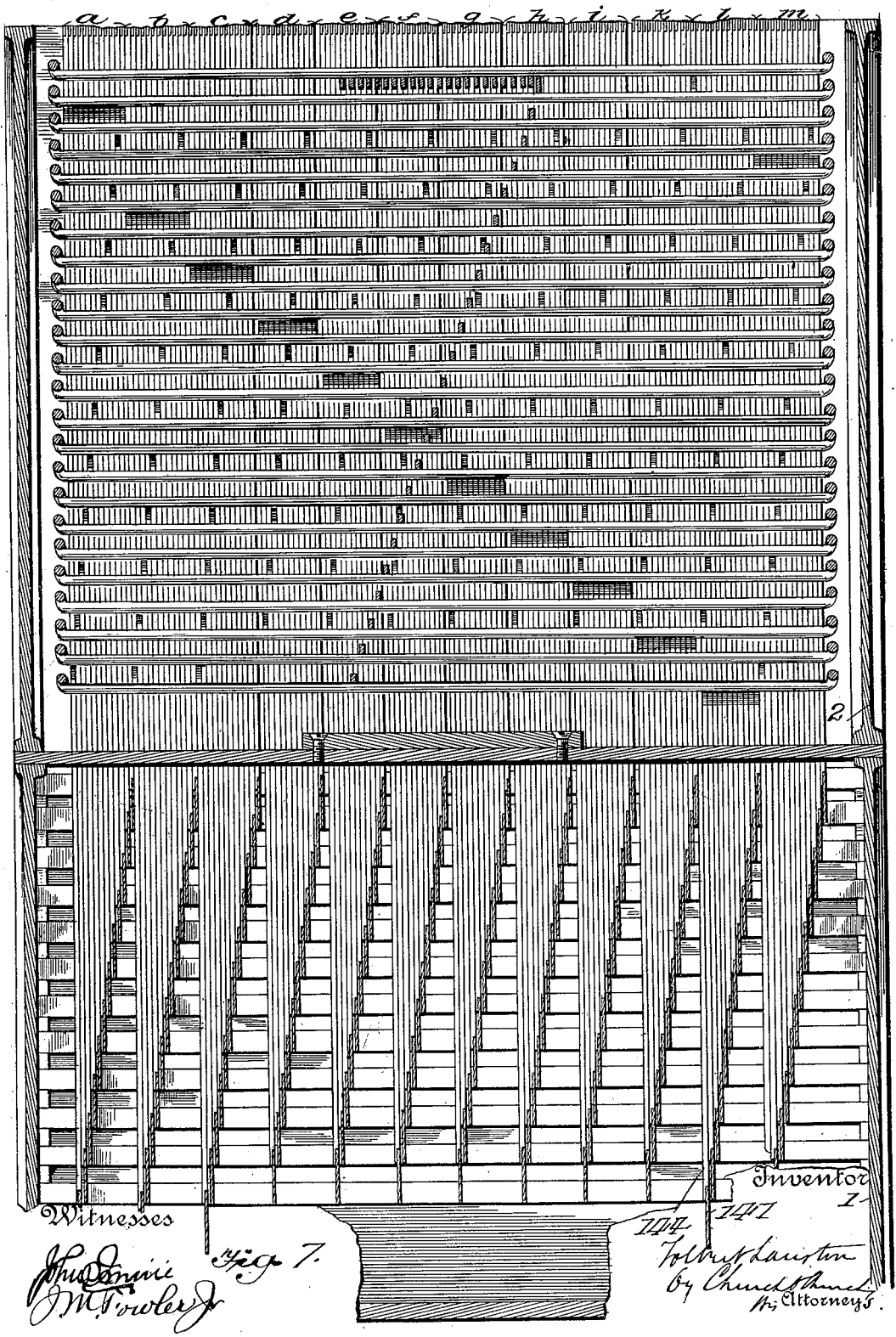

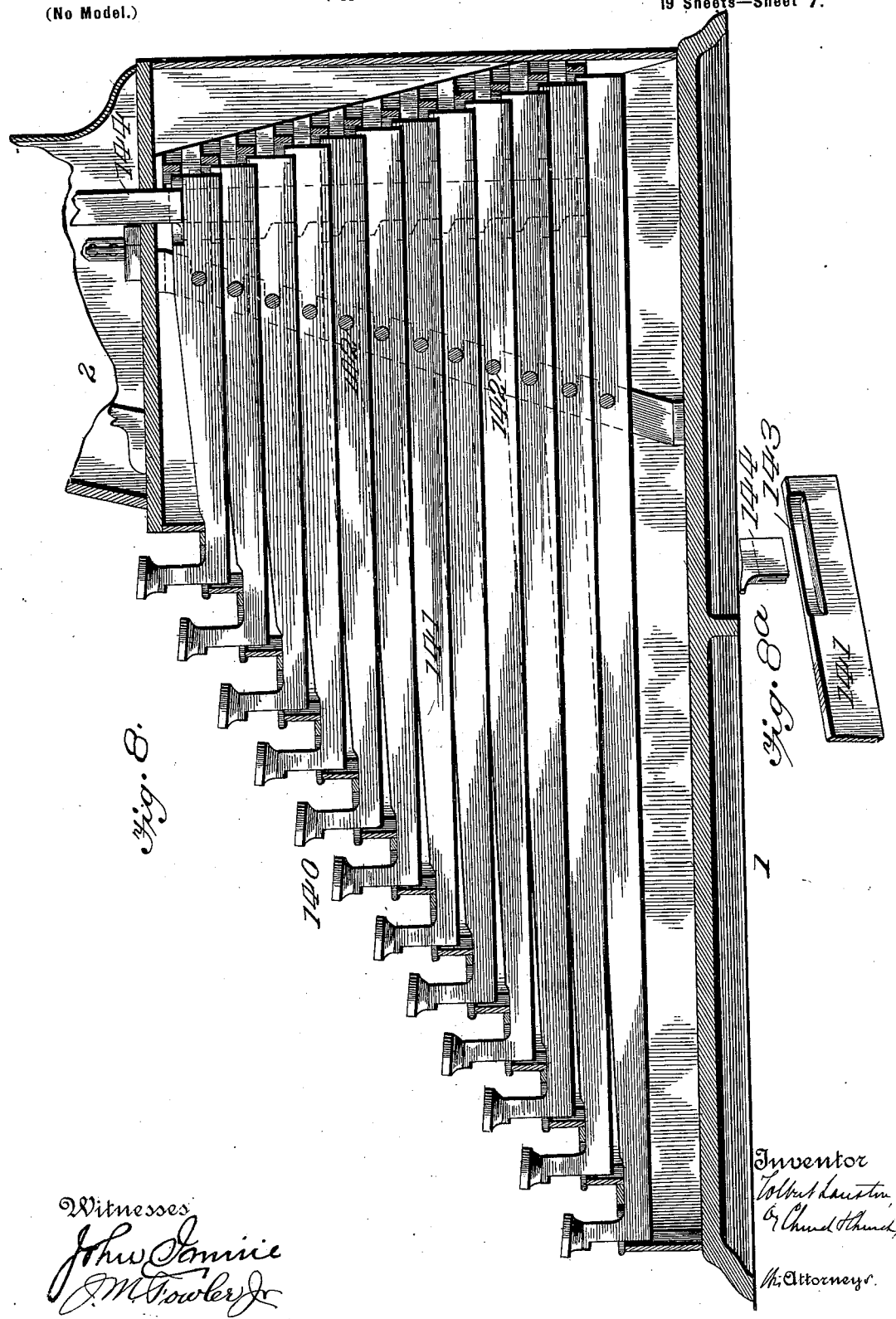

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 8.
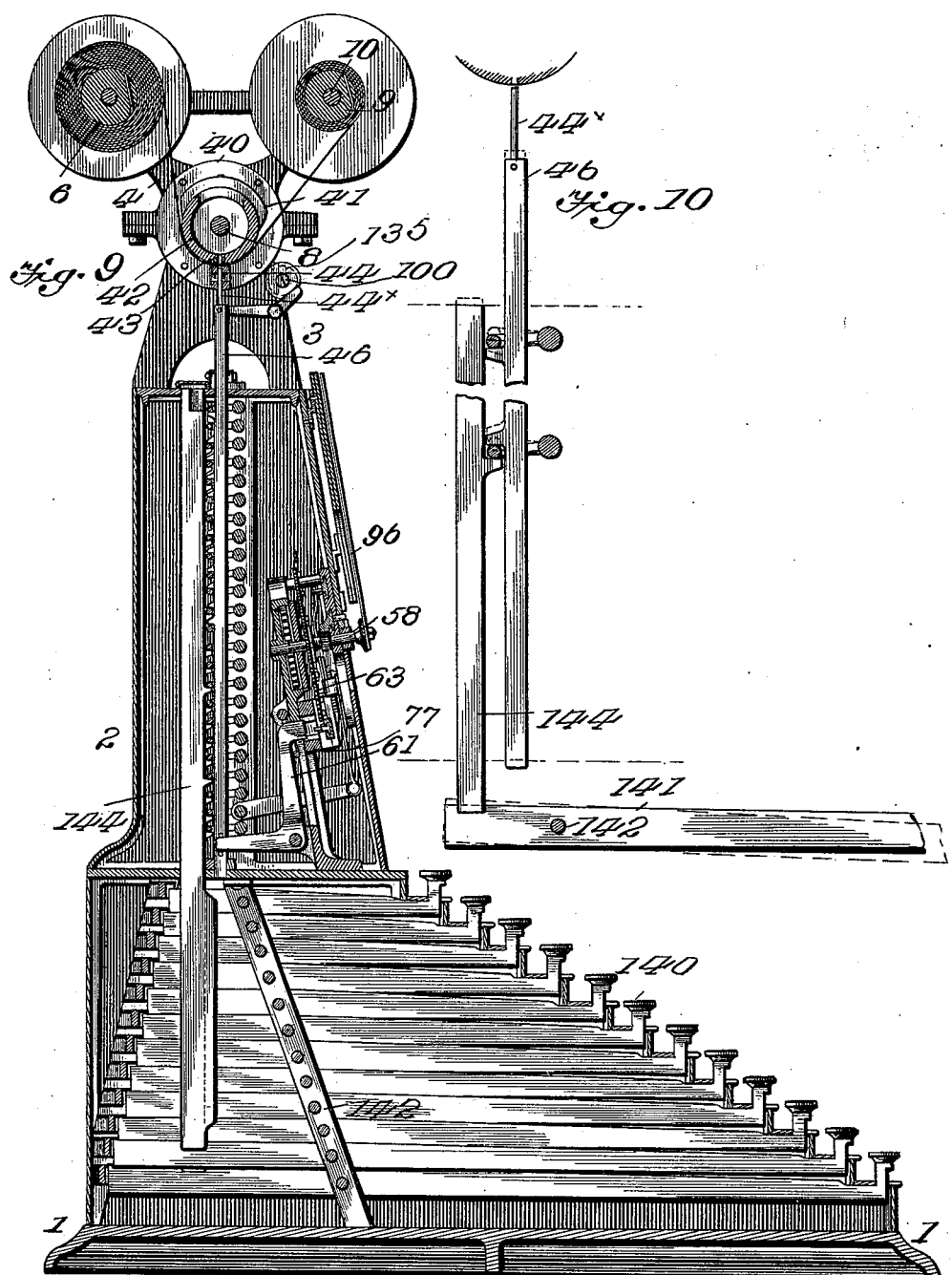

No. 663,996. Patented Dec. 18, 1900.
T. LANSTON.
MACHINE FOR PERFORATING RECORD STRIPS.
(Application filed Dec. 31, 1897.)
(No Model.)
19 Sheets—Sheet 9.

Witnesses
Inventor
Tolbert Lanston,
Attorneys

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 10.
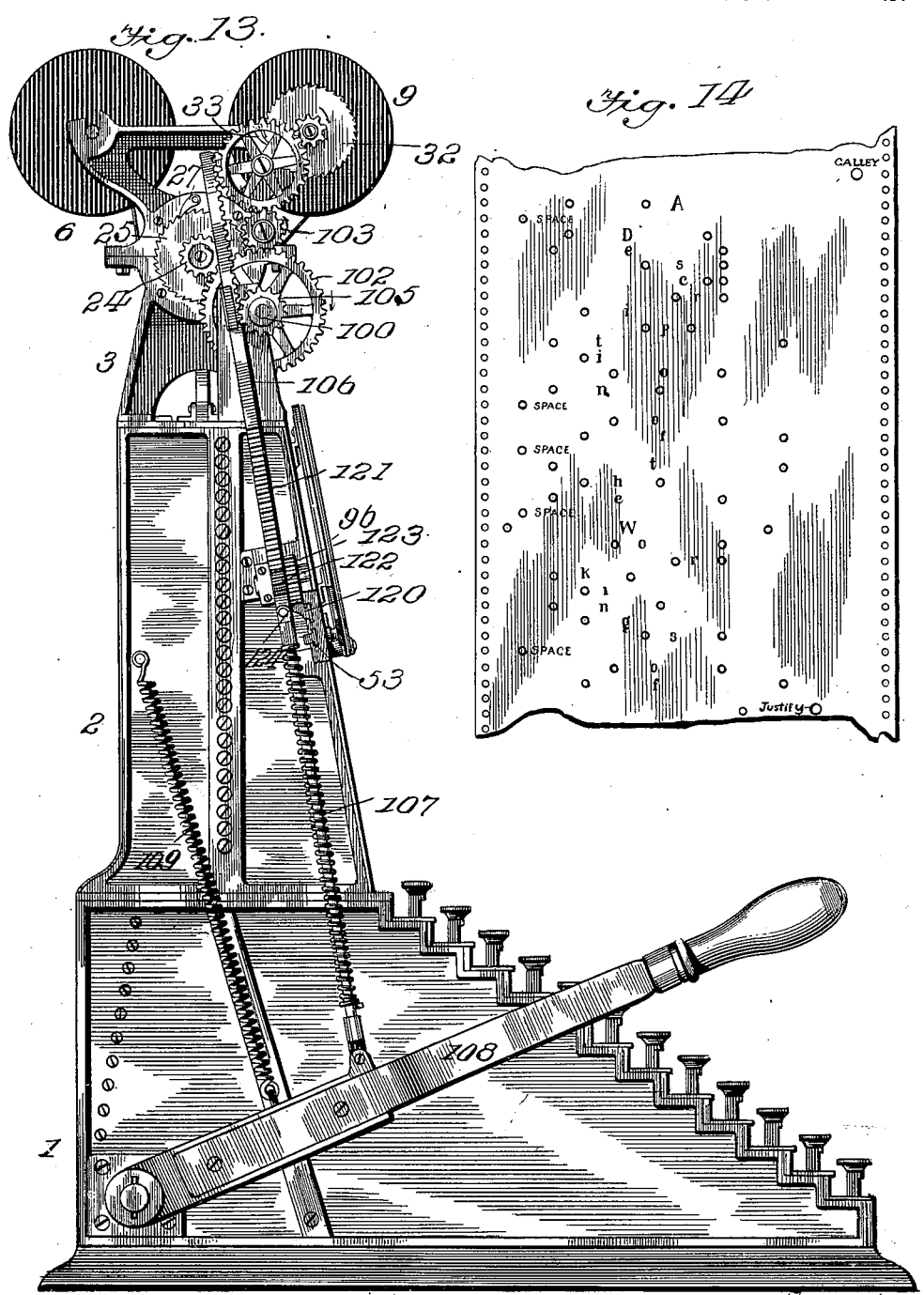

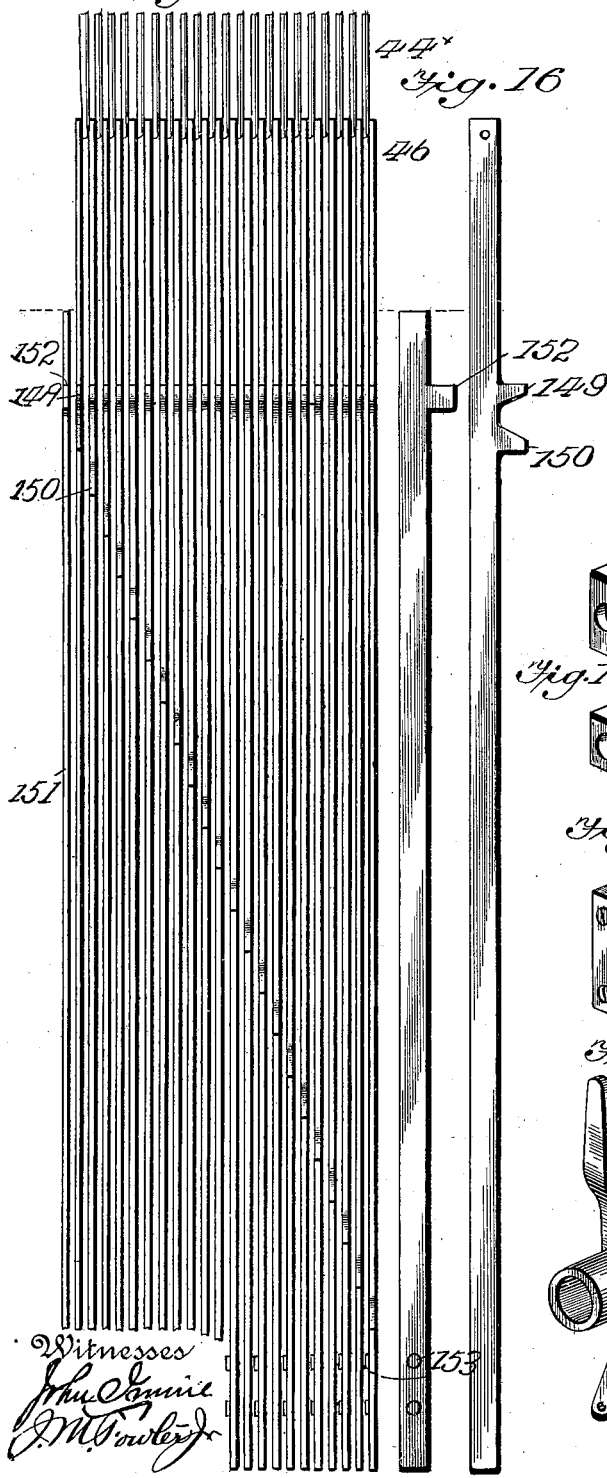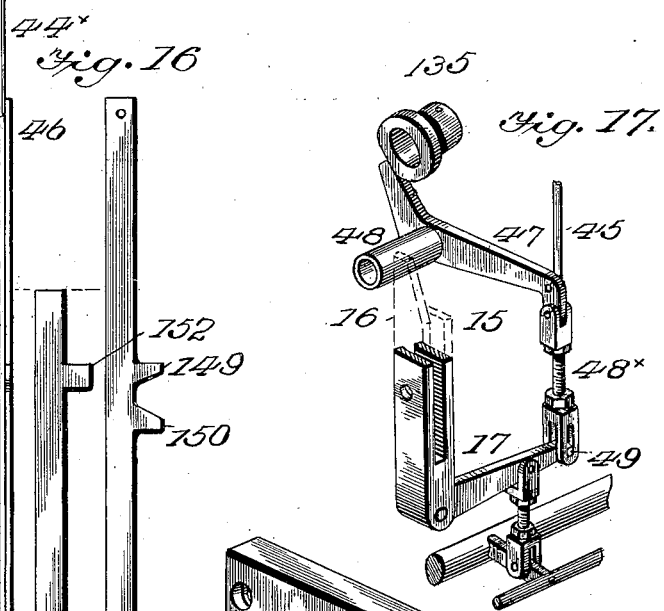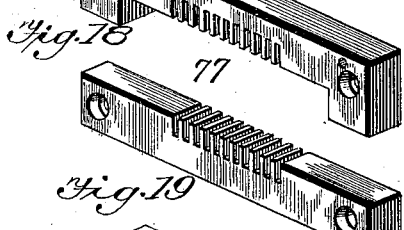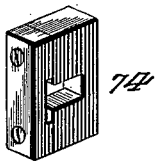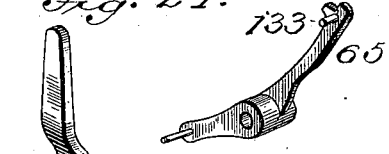

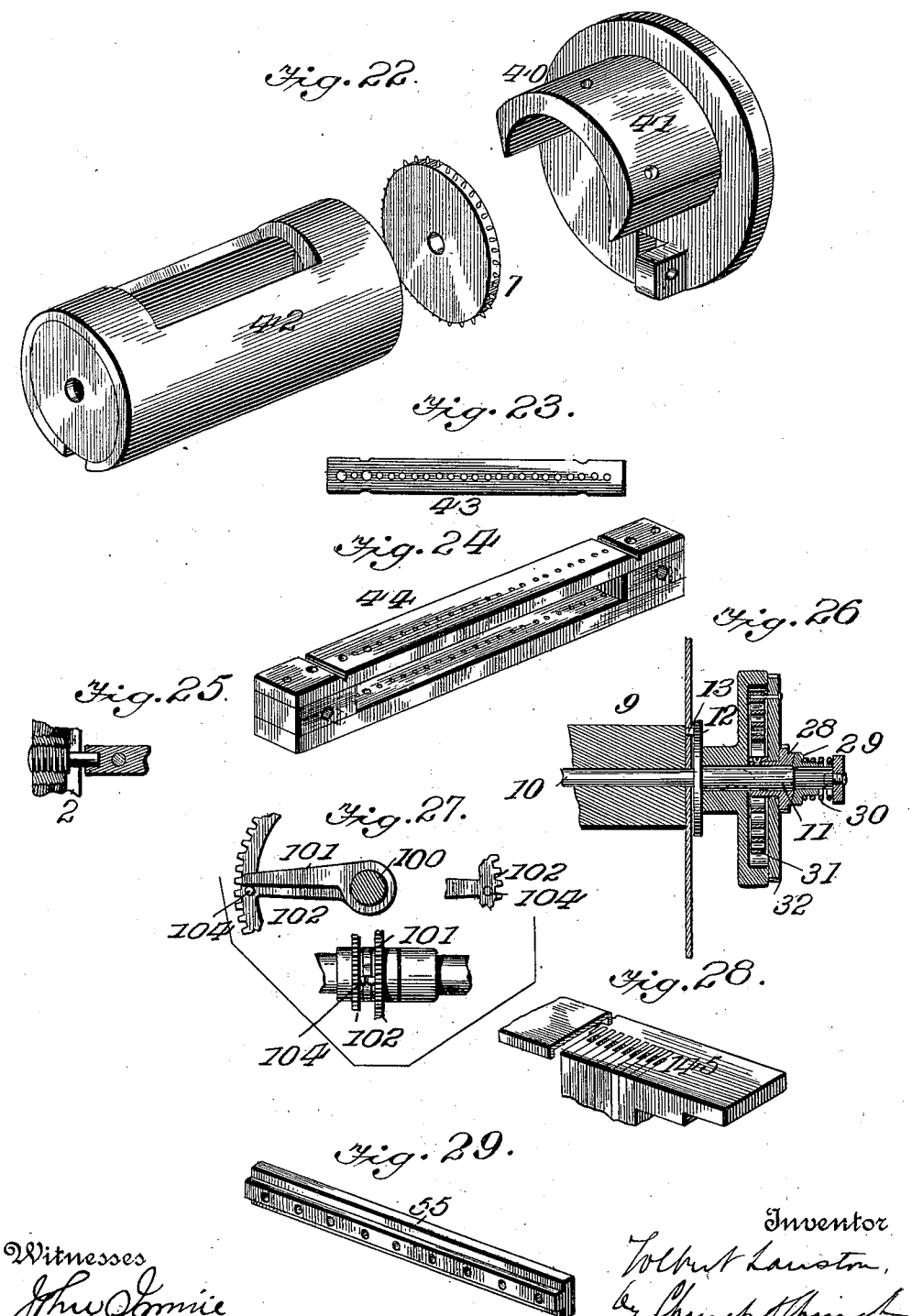

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 13.
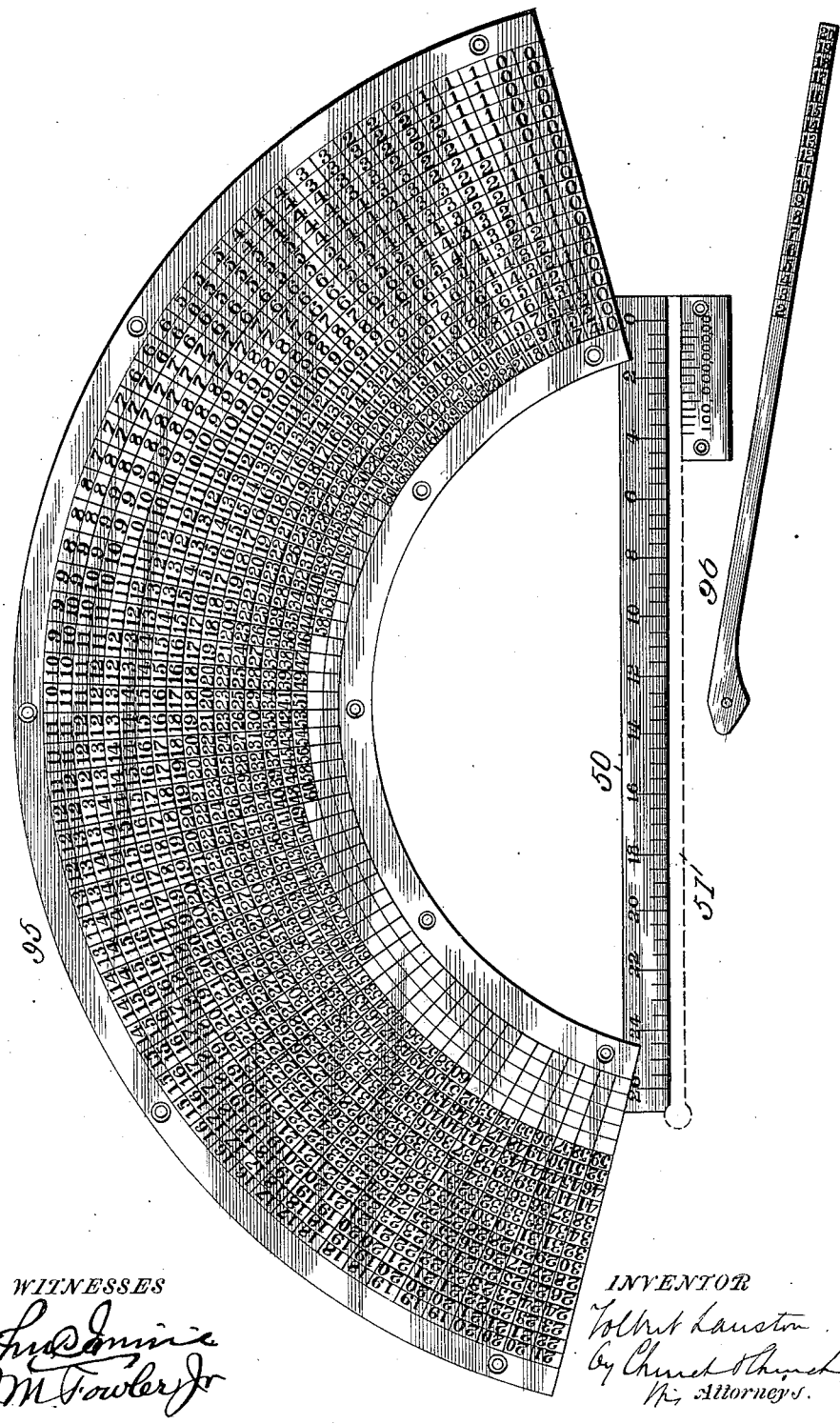

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 14.
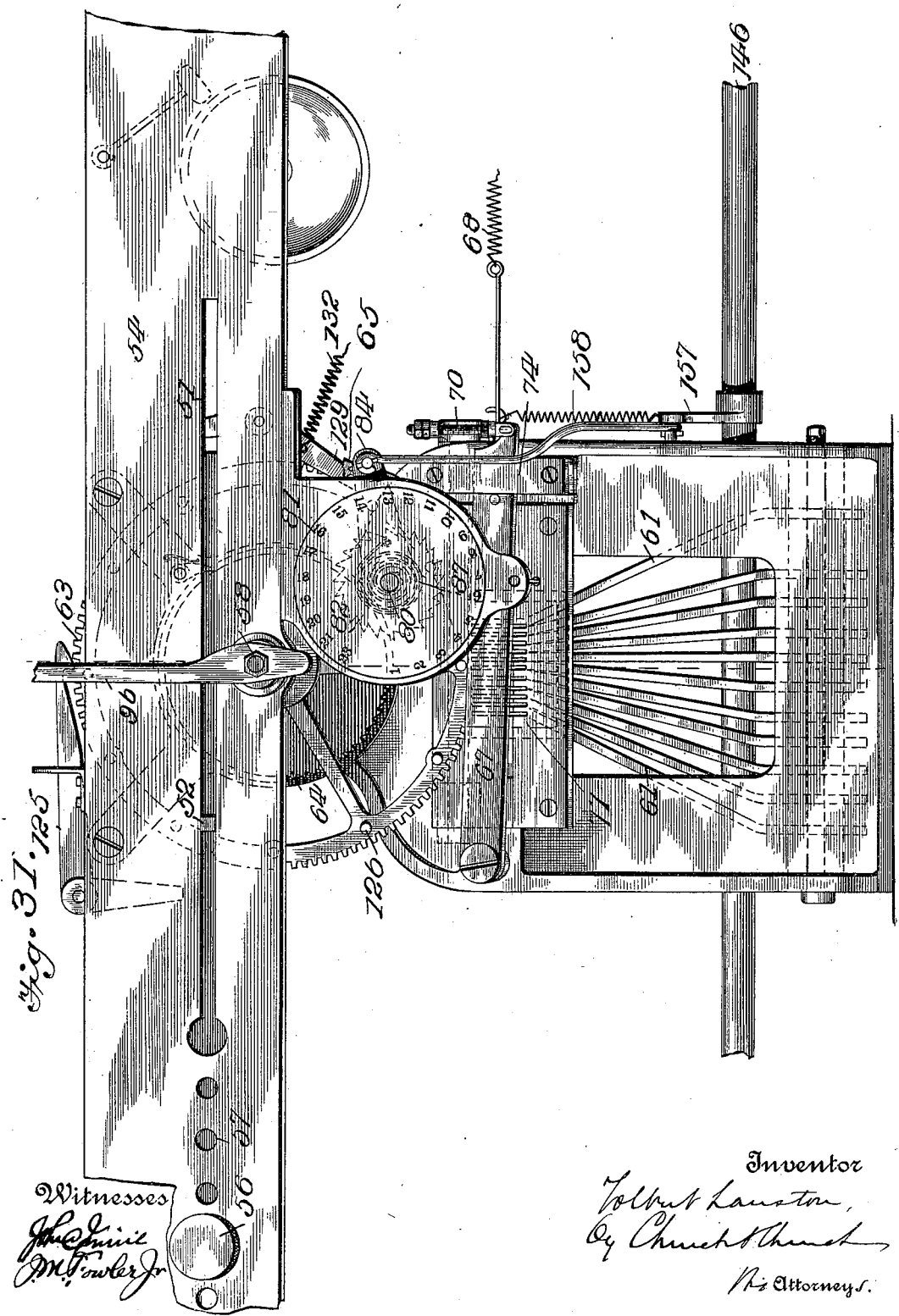

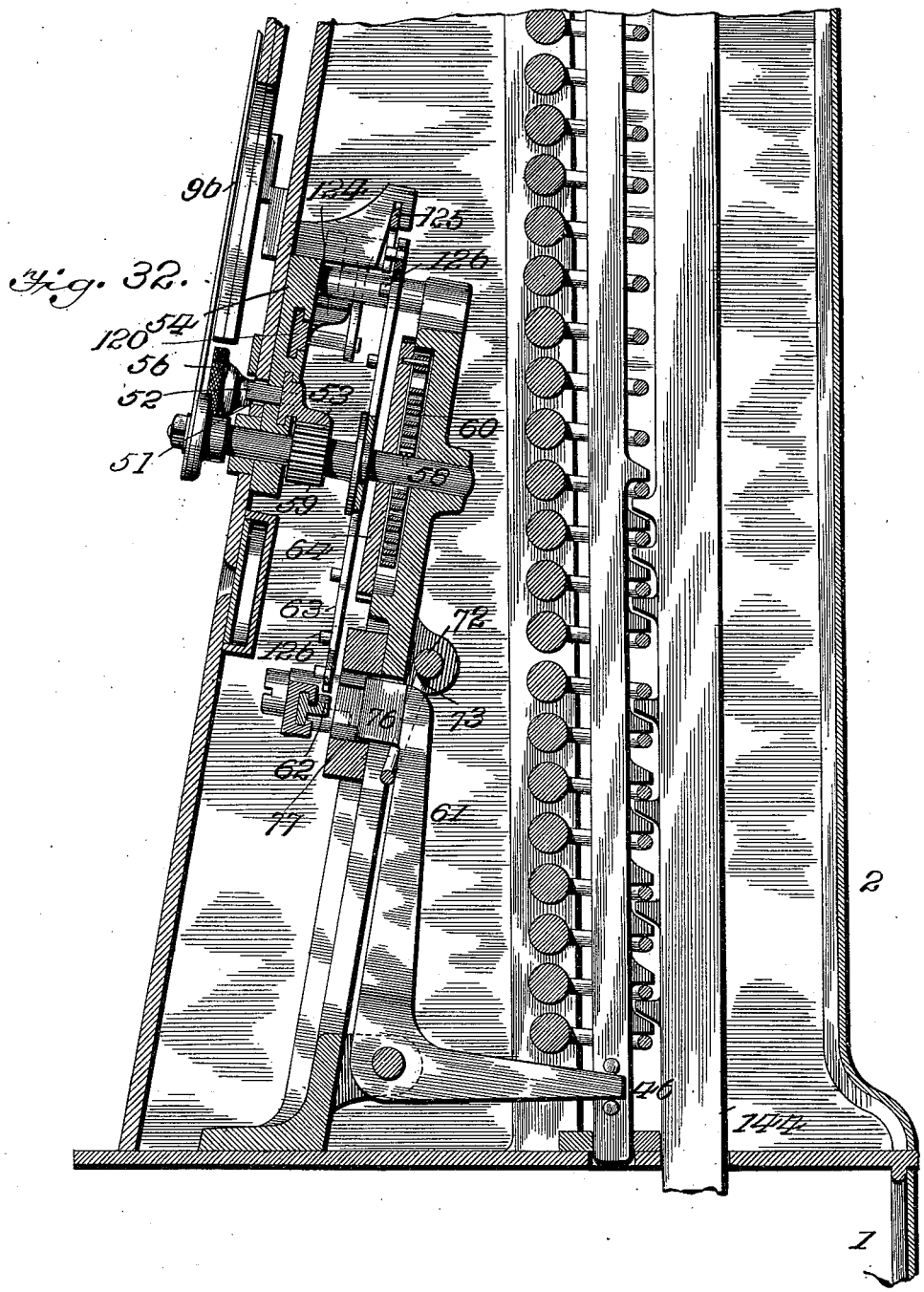

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 16.
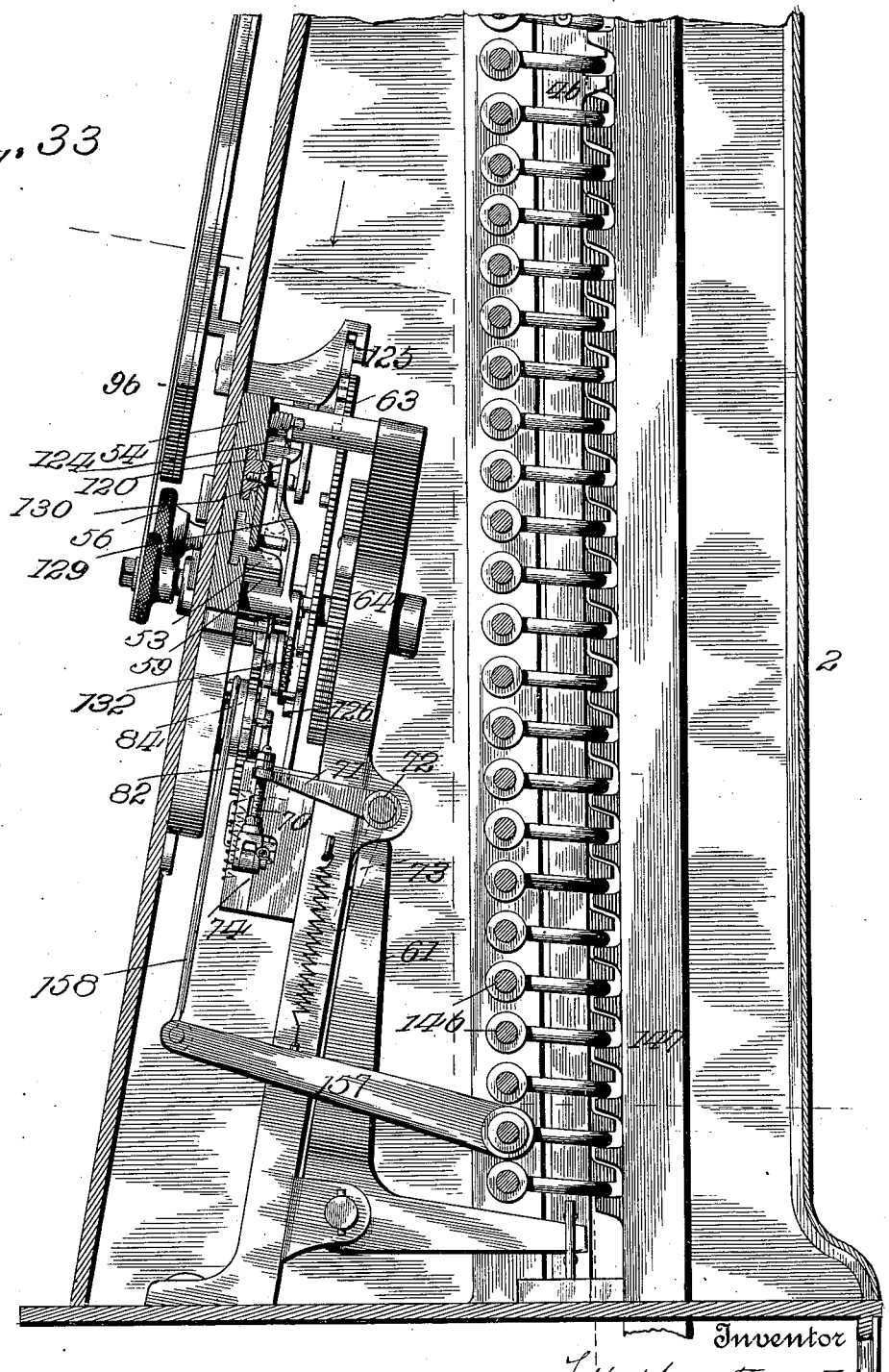

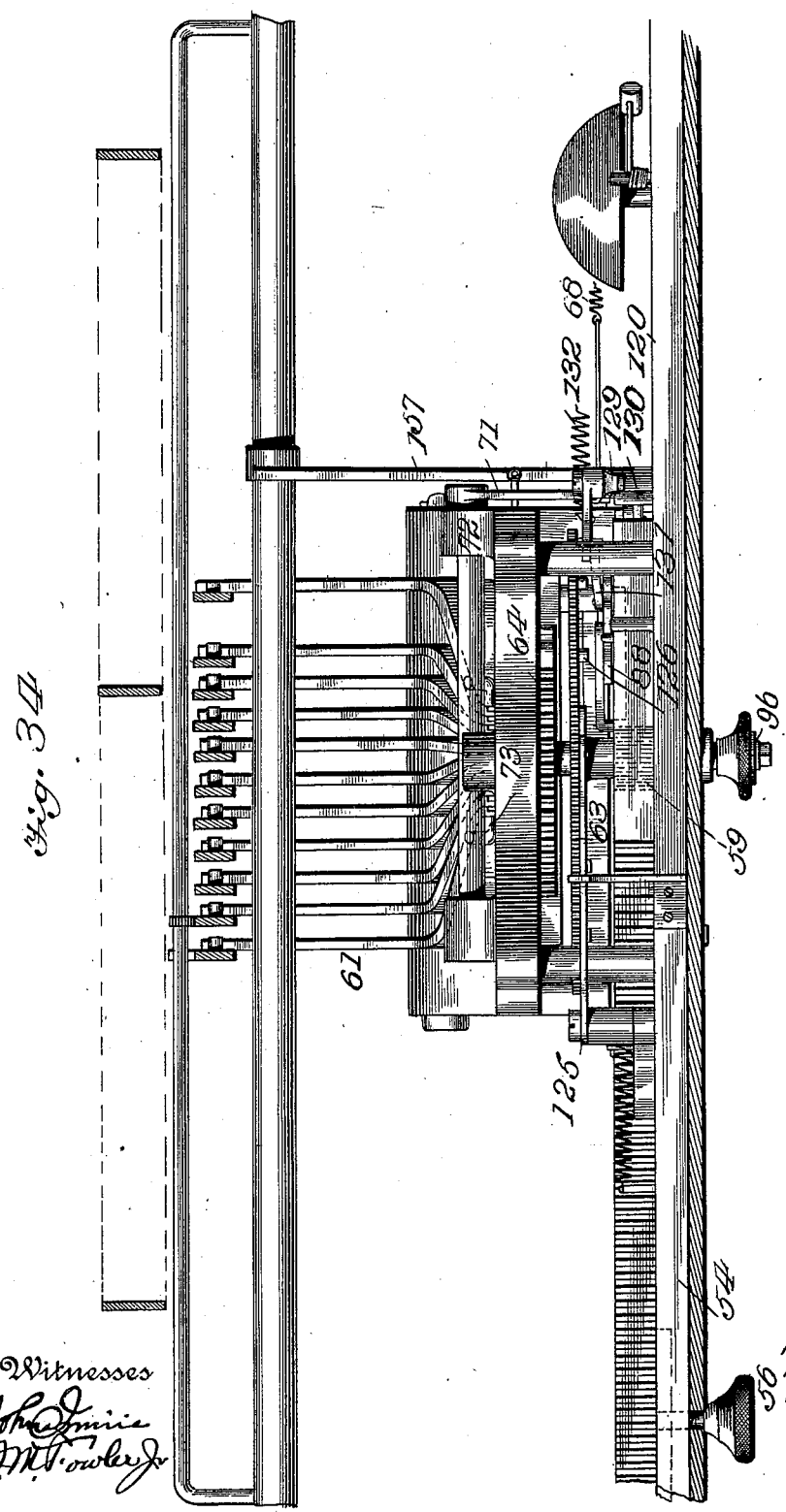

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 18.
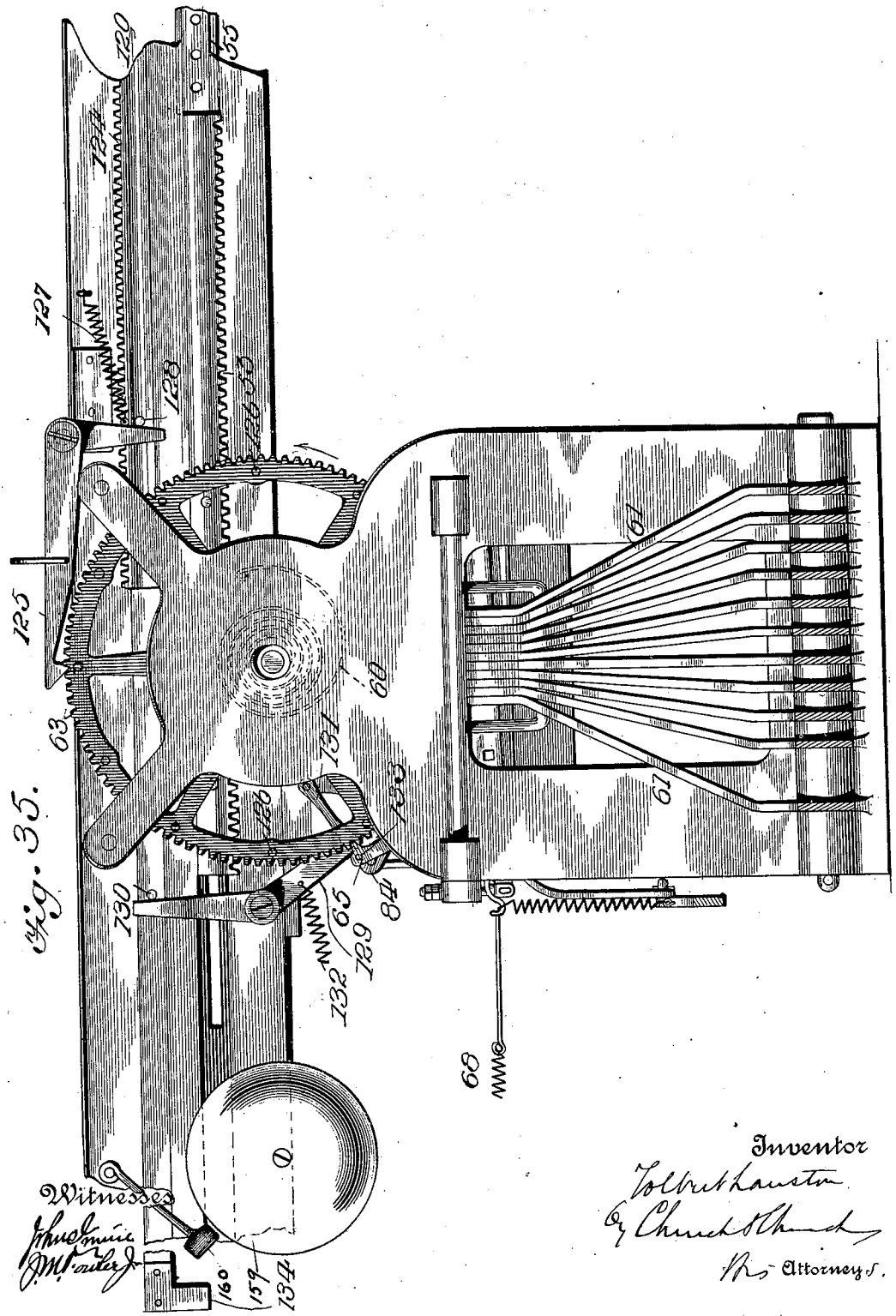

No. 663,996. Patented Dec. 18, 1900.
T. LANSTON.
MACHINE FOR PERFORATING RECORD STRIPS.
(Application filed Dec. 31, 1897.)
(No Model.) 19 Sheets—Sheet 19.
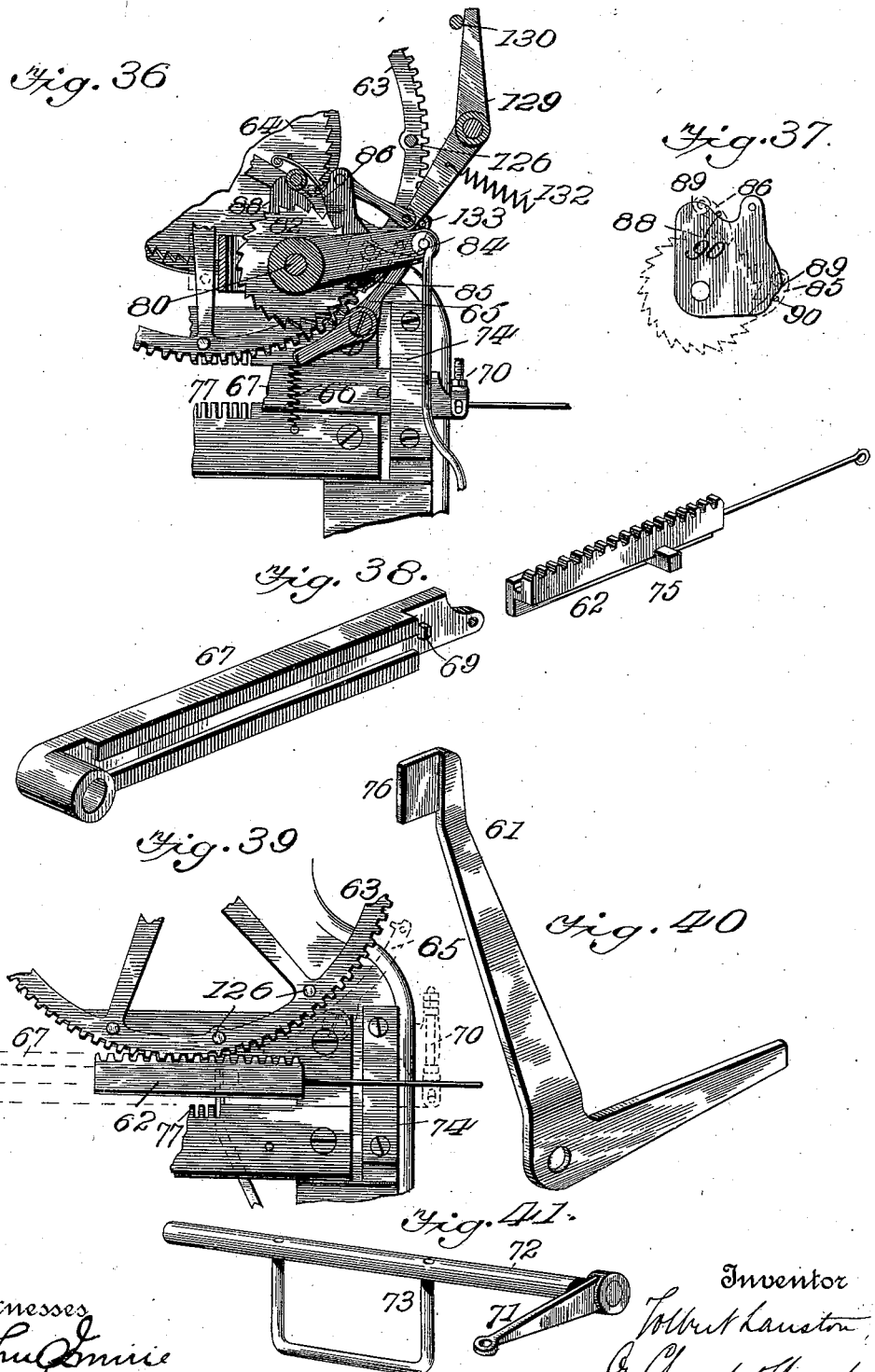

UNITED STATES PATENT OFFICE.

TOLBERT LANSTON, OF WASHINGTON, DISTRICT OF COLUMBIA, ASSIGNOR TO THE LANSTON MONOTYPE MACHINE COMPANY, OF SAME PLACE.

MACHINE FOR PERFORATING RECORD-STRIPS.

SPECIFICATION forming part of Letters Patent No. 663,996, dated December 18, 1900.

Application filed December 31, 1897. Serial No. 664,975. (No model.)

*To all whom it may concern:*

Be it known that I, TOLBERT LANSTON, of Washington, in the District of Columbia, have invented certain new and useful Improvements in Machines for Preparing Perforated Record-Strips of Type-Forming Machines; and I do hereby declare the following to be a full, clear, and exact description of the same, reference being had to the accompanying drawings, forming part of this specification, and to the characters of reference marked thereon.

This invention relates to and constitutes an improvement upon the class of machines described in my prior patent, No. 590,763, of September 28, 1897.

The machine is specially organized for the economical, expeditious, and accurate production of perforated record or controlling strips employed in connection with type-machines belonging to what is known as the "Lanston monotype system," wherein and whereby justified lines of types are produced and assembled in proper form according to a prearranged order and system, said record-strip serving as the controlling medium for governing the operations of the mechanisms employed in the formation and assembling of the types.

For convenience of description the devices which go to make up the complete perforating-machine may be divided into groups more or less connected and related to each other, but each having immediate reference to certain designated operations or functions of the machine considered as a whole. These groups or divisions are, first, the paper-feeding mechanism for advancing the strip at regular intervals and holding it in position to receive the punches; second, the punching mechanism, by means of which the perforations are made in the record-strip, said perforations being properly distributed or multiplied, so as to represent the separate types, points, spaces, &c., pertaining to the selected font and to govern their body widths, while certain other perforations control the setting of the justifying mechanism and inaugurate the movement of the galley mechanism at the completion of each line; third, the line-registering mechanism for indicating the amount of space which will be occupied by types of normal widths and showing the amount of unfilled space or spaces requiring to be filled by justification; fourth, the space-counting mechanism for indicating the number of justifying space-type included in the line; fifth, the justifying-indicator for indicating to the operator the appropriate justification-perforations required to produce a justified line; sixth, the keyboard mechanism, operating either mediately or immediately upon the before-mentioned mechanisms to control their movements, and, seventh, the resetting devices for restoring the mechanism to its normal or zero position after the record for a line has been completed and preliminary to the formation of a record for the next succeeding line.

With this preliminary explanation I will proceed to explain the details of the several mechanisms and their correlation, specifying in the appended claims the novel features of my present invention.

Figure 2:
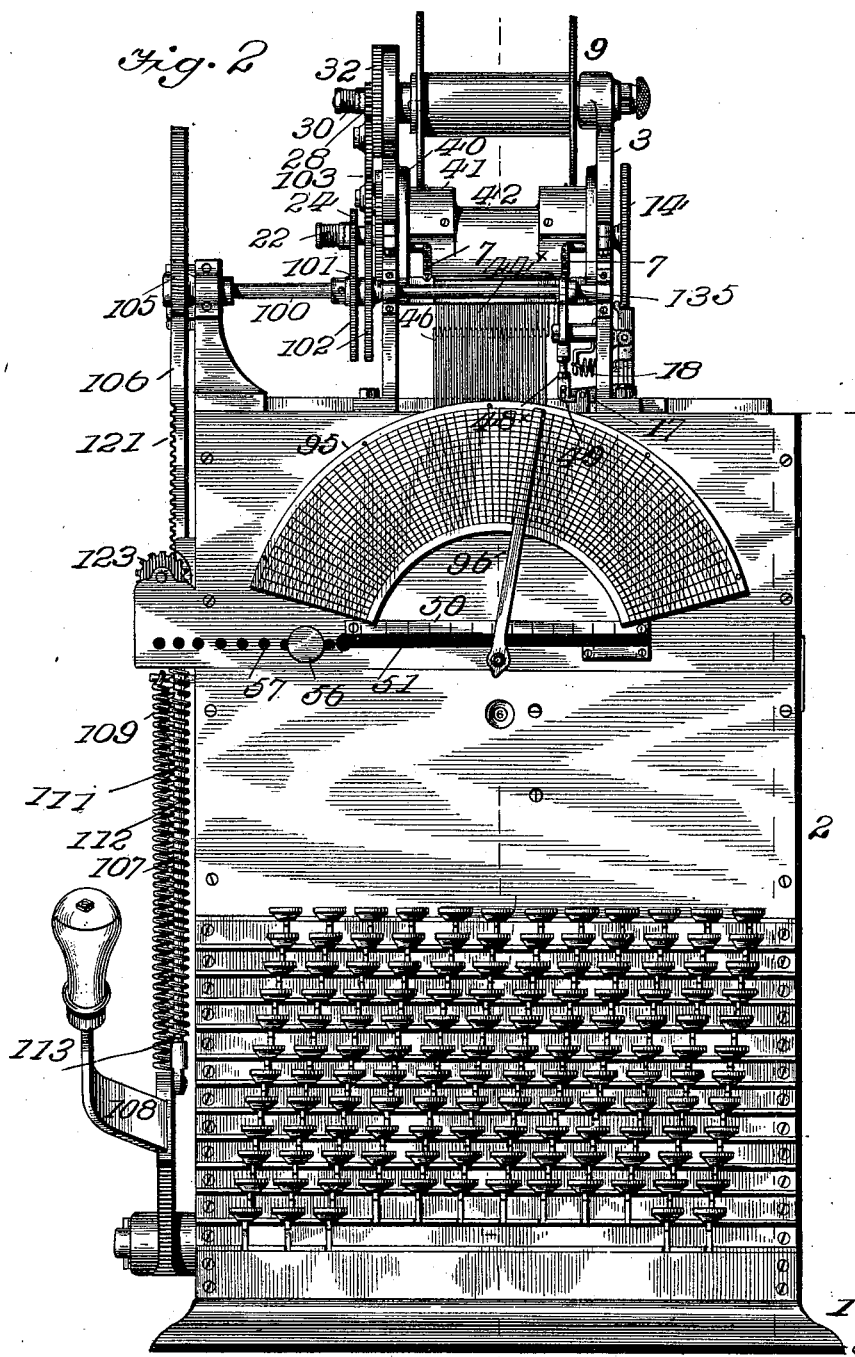
Figure 3:
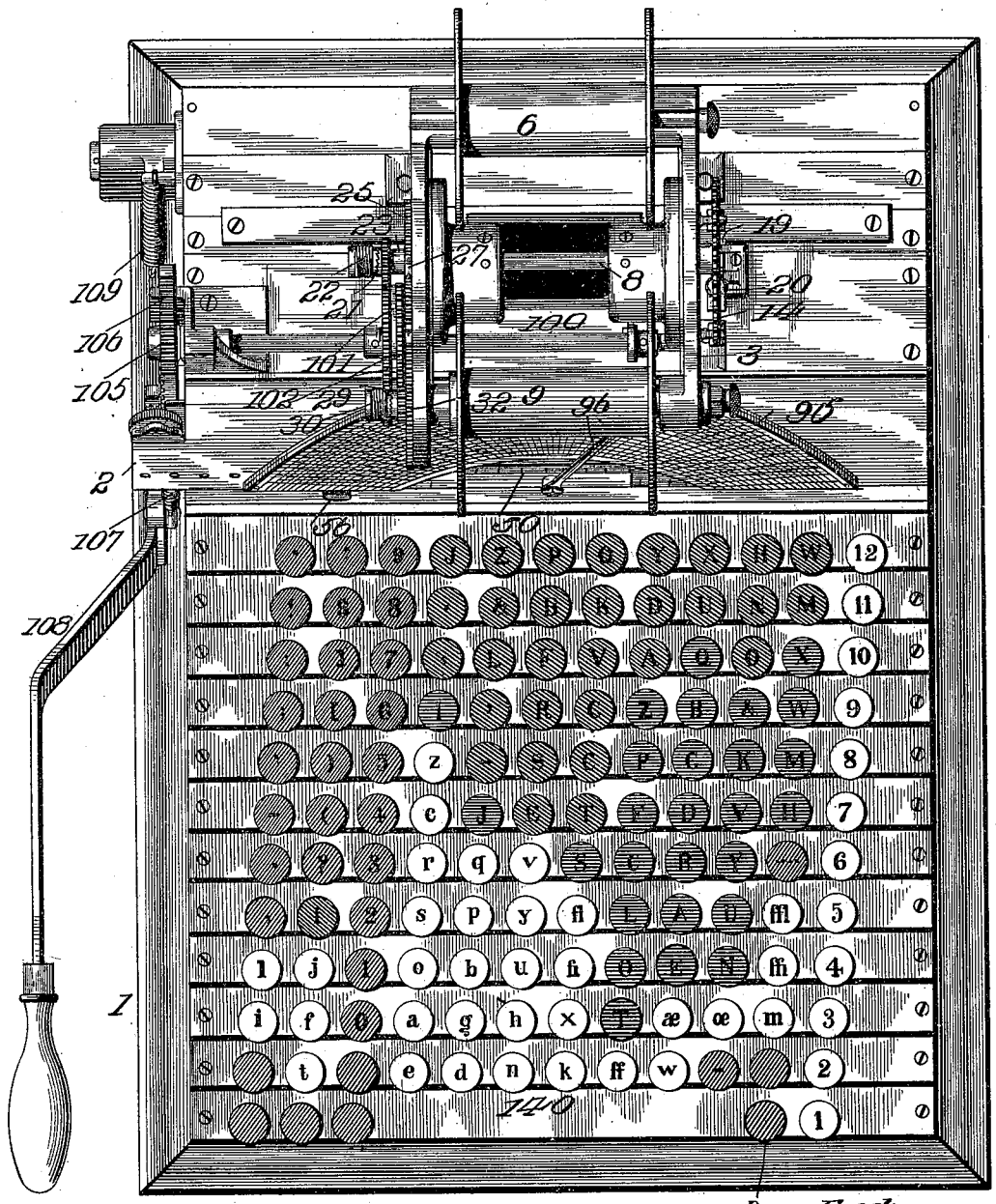
Figure 11:
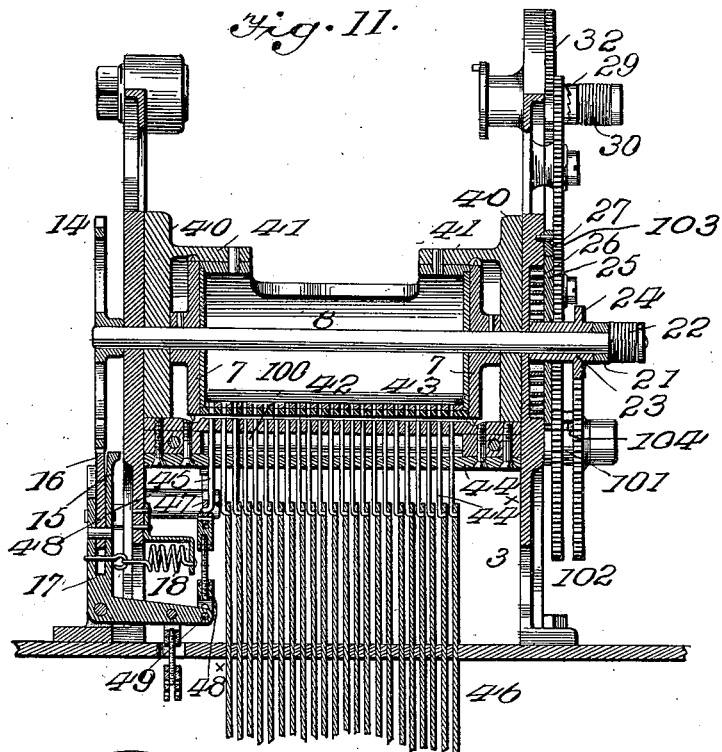
Figure 12:
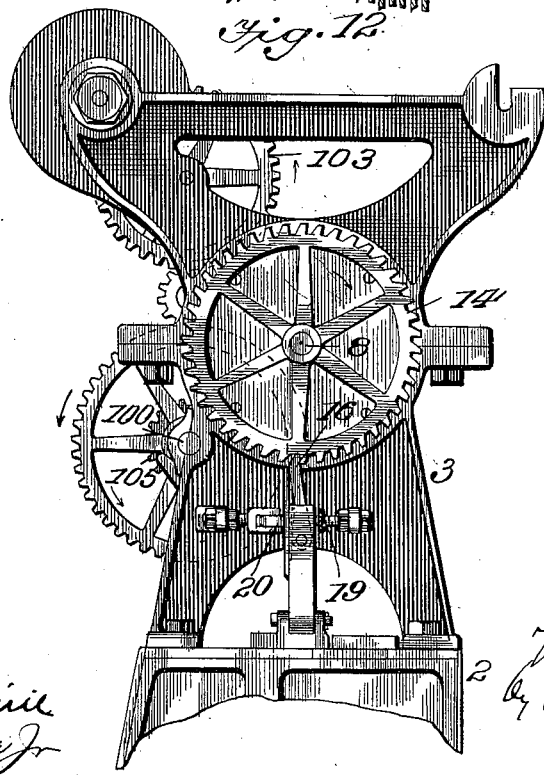

Referring to the accompanying drawings, Figure 1 is a view in perspective of the complete machine. Fig. 2 is a front elevation. Fig. 3 is a top plan view. Fig. 4 is a top plan view of the keyboard, the upper portion of the frame, with its contained mechanisms, being removed and the lifting-bars shown in section. Fig. 5 is a rear view with covering-plate removed, showing the lifting-bars. Fig. 6 is a detail showing the safety connection for the resetting mechanism. Fig. 7 is a vertical sectional view in a plane intermediate the lifting-bars and punch-bars, Fig. 9, looking toward the lifting-bars. Fig. 8 is a vertical sectional view through the keyboard, showing the arrangement of the keys and key-levers. Fig. 8$^a$ is a detail showing the connection between the key-levers and lifting-bars. Fig. 9 is a vertical central section through the entire machine. Fig. 10 is a detail view showing the tilting connection between the lifting-bars and punch-bars. Fig. 11 is a longitudinal vertical sectional view through the punching and paper-feeding mechanisms looking toward the front of the machine. Fig. 12 is an end view of the paper-feeding mechanism. Fig. 13 is a left-hand end elevation of the machine. Fig. 14 is a diagrammatic view of a strip, showing arrangement of perforations. Fig. 15 is a rear elevation of the gang of punch-bars. Fig. 16 is a side elevation of one of the punch-bars and the stop-lifter. Fig. 17 is a perspective view showing the galley-punch mechanism and escapement. Fig. 18 is a detail showing guides for stop-levers. Fig. 19 is a detail view of the guide for unit-wheel rack-carrier. Fig. 20 is a detached view of holding-pawl for unit-wheel. Fig. 21 is a detail of the knock-off for holding-pawl and space-counter. Fig. 22 is a detail view showing the die-holder, one of the pin-wheels, and one of the supports. Fig. 23 is a view of the die-plate. Fig. 24 is a detail showing the punch-guide. Fig. 25 is a detail showing one of the bearings for the tilting shafts. Fig. 26 is a sectional view of a portion of the take-up mechanism for the strip. Fig. 27 is a detail showing a portion of the spring-restoring mechanism of the paper-feed. Fig. 28 is a perspective view representing a section of the upper guide for the lifting-bars. Fig. 29 is an adjustable stop for line-gage. Fig. 30 shows the justifying-index, line-gage, and index-hands. Fig. 31 is a front elevation of the line-measuring mechanism and space-counter. Fig. 32 is a vertical central section through the line-measuring mechanism, also including a portion of the tilting shafts, lifting-bars, punch-bars, and stop-lever. Fig. 33 is a side elevation, partly in section, of the line-measuring mechanism and space-counter. Fig. 34 is a top plan view of the line-measuring mechanism. Fig. 35 is a rear view of the line-measuring mechanism, showing the stop-levers and portion of the resetting mechanism. Fig. 36 is a detail view showing a portion of the space-counter mechanism and part of the line-measuring mechanism. Fig. 37 is a detail view of the pawl-releasing cam for space-counter. Fig. 38 is a detached view showing the unit-wheel rack and carrier. Fig. 39 is a detail view showing a portion of the unit-wheel, unit-wheel rack, and stop-lever. Fig. 40 is a detail view of one of the stop-levers. Fig. 41 is a detail view of the lifting device for unit-wheel rack-carrier.

Like characters of reference in the several figures indicate the same parts.

The working mechanism is conveniently mounted in a suitable frame, the finger-keys being located in the base, the paper-feed and punching devices at the top, and the line and justification registers and space-counters in the intermediate section. For convenience the intermediate section 2 is made separate from the base 1 and detachably secured thereto, while the upper frame 3 is detachably secured to the top of the intermediate section or frame 2.

*Paper-feeding mechanism.*—The paper-feeding mechanism is best seen in Figs. 1 to 13, inclusive, certain details being also shown in Figs. 26 and 27. The housings or vertical sections of frame 3 are furnished with two sets of bearings 4, the rear set of bearings being open for the ready insertion of the supporting-spindle 5, upon which is mounted the supply-spool 6, containing the paper strip previously provided with marginal perforations, Fig. 14. As the paper is drawn from the supply-spool 6 it passes under the die-holder and die of the punching mechanism hereinafter described and around two pin-wheels 7, mounted on shaft 8, journaled in the housings 3, and is carried thence to the winding-spool 9, where it is stored, after being perforated, ready for application to the type-casting machine. The winding-spool 9 is provided with a longitudinal perforation for the passage of a spindle 10, the latter passing through the bearing on one side of the frame and being supported at the opposite end in the hollow end of a shaft 11, supported in the opposite bearing on the frame. Shaft 11 is furnished with a head or flange 12, provided with a pin 13, adapted to enter a recess or hole in the head of the winding-spool 9, Fig. 26, said connection serving to cause shaft 11 and the winding-spool to turn together.

The feeding forward of the paper is effected through the instrumentality of pin-wheels 7, engaging the feeding-perforations along opposite margins of the strip, for which purpose a spring-motor and an escapement device are connected with shaft 8, bearing said pin-wheels. The escapement mechanism is located at the right-hand end of shaft 8 and comprises a toothed escapement-wheel 14, secured to the shaft, and a double-pawl escapement comprising a rigid pawl 15 and loose pawl 16, mounted upon a bell-crank lever 17. (See Figs. 11 and 12.) This bell-crank lever is arranged to reciprocate in a plane transverse to the plane of the escapement-wheel 14, so as to bring the rigid and loose pawls alternately into the path of the teeth on the escapement-wheel. Loose pawl 16 is provided with a retracting-spring 18, tending to throw said pawl in a direction the reverse of the feeding movement of escapement-wheel 14, and an adjustable stop 19 determines or limits the movement and position of the pawl 16 in one direction—that is to say, in opposition to the movement of the escapement-wheel—while a stop 20 on the opposite side limits the movement of the pawl 16 in the direction of the feed, said stop 20 being provided with a roller to diminish friction. The adjustment is such that when the machine is at rest bell-crank lever 17 will occupy the position shown in Fig. 11, the loose pawl 16 being in engagement with the tooth of escapement-wheel 14 and held in its advanced position against stop 20, as shown in Fig. 12. At this time rigid pawl 15 stands in the same plane with loose pawl 16, so that when the lower arm of the bell-crank lever is elevated loose pawl 16 will be withdrawn and rigid pawl 15 will take its place in rear of the same tooth on escapement-wheel 14. As soon as loose pawl 16 passes beyond the escapement-wheel its spring 18 will retract said pawl until it contacts with its stops 19, thereby measuring the distance of one tooth on the escapement-wheel, so that upon the descent of lower arm of bell-crank lever 17 loose pawl 16 will engage the next tooth in rear of that one in contact with rigid pawl 15, and as soon as the latter is withdrawn from the plane of the escapement-wheel simultaneously with the entrance of loose pawl the latter will be swung forward the distance of one tooth, and thus be brought into line with rigid pawl 15, thereby permitting the advance of the pin-wheels a distance equal to the space between successive teeth on the escapement-wheel.

The motor devices for causing the advance movement of the pin-wheels and the regular feeding of the paper strip, as controlled by the escapement, are located at the opposite end of shaft 8 and comprise a clutch-section 21, movable longitudinally of the shaft, but turning therewith through the medium of a feather and spline or equivalent connection, and held projected toward the frame by the yielding pressure of a spring 22, interposed between said clutch-section and a collar on the end of shaft 8. A sleeve 23, mounted loosely upon shaft 8 and carrying pinion 24, is furnished with a tooth or clutch section opposite clutch-section 21. Sleeve 23 is also provided with a ratchet-plate 25, forming a cover for a pocket or recess in the face of the upright housing, and within said recess is located a spring 26, one end of which is attached to ratchet-plate 25 and the opposite end to sleeve 23. The ratchet-plate 25 serves for adjusting the tension of spring 26 and is held in adjusted position by a pawl 27, pivoted on the frame and engaging the teeth on the periphery of said plate 25. It will thus be seen that spring 26 furnishes the motive power for effecting the feed movement, while the escapement by its movements regulates and controls the times and extent of such feed movements.

A separate motor device is employed for rotating winding-spool 9, so as to take up slack and keep the paper taut, said motor device operating in conjunction with the feed to assist drawing the paper forward. The arrangement for this purpose is quite similar to that connected with the pin-wheel shaft 8. Upon shaft 11 is loosely mounted a pinion-sleeve 28 and a movable clutch-section 29, the latter feathered to the shaft, but free to slide longitudinally thereof, while a spring 30, interposed between clutch-section 29 and a collar on the shaft, operates to hold said clutch-section normally in engagement with a corresponding clutch-face on pinion-sleeve 28. A motor-spring 31 has one end attached to pinion-sleeve 28 and its opposite end to ratchet-plate 32, the latter engaged by a pawl 33 on the frame, whereby the tension of this spring may be adjusted or set.

It will be observed that spring 31, operating through the supply-spool 9, performs the office of rolling up the paper strip as it is delivered from the punching mechanism, while spring 26 maintains the feeding movement, so that the only part requiring the exertion of force on the part of the operator to effect the feed movement is the bell-crank lever carrying the escapement-pawls, thus reducing to the minimum the necessary expenditure of power on the part of the operator for advancing the paper preliminary to the formation of the successive lines of perforations.

*The punching mechanism.*—The punching mechanism is located between the upright members of and partly supported upon the frame 3 of the paper-feeding mechanism. To the inner side of each of the uprights and surrounding pin-wheel shaft 8 is secured a plate or head 40, bearing a semicircular flange 41, and to these flanges 41 is fastened the hollow cylindrical die-holder 42, the latter provided with heads fitting shaft 8. The lower portion of die-holder 42 is furnished with a longitudinal slot for the reception of a detachable die-plate 43, Fig. 23, said die-plate having a longitudinal series of holes with which the punches coöperate in perforating the paper. An opening is formed in the upper section of the die holder 42, Figs. 11 and 22, for the convenient removal of punchings. Beneath the die-holder 42 and attached at opposite ends to plates 40 is the punch-guide 44, Fig. 24, the same comprising two parallel bars, each furnished with a series of guide-openings for the punches.

In the present machine there are employed a series of punches $44^X$, controlled by the keyboard mechanism, and a separate punch 45, known as the "galley-punch," controlled by the resetting devices. The punches are arranged in line in a plane parallel with the axis of pin-wheel shaft 8, so that they occupy a position transverse of the machine. In the present machine there are twenty-two punches 44, representing individual or any combination of letters, points, spaces, and justification-perforations for controlling the type-casting machine, and each of said punches is attached at its lower end to one of a series of punch-bars 46, guided to reciprocate vertically and operating through mechanism hereinafter to be described to elevate the punches and drive them through the paper into their respective dies in die-plate 43. The galley-punch 45 occupies a position at the extreme right-hand end of the series of punches and is connected at its lower end, Figs. 11 and 17, to one arm of a lever 47, pivotally supported at 48 on the frame. For the purpose to be hereinafter described this lever 47 is provided with an adjustable link $48^X$, whose lower member is slotted for the reception of a pin 49 on bell-crank lever 17, which actuates the escapement-pawls, said slot connection serving to permit the bell-crank lever to be vibrated without elevating the galley-punch, but causing said bell-crank lever to be operated whenever galley-punch is elevated, thus effecting a feed movement of the paper after each elevation of said galley-punch.

*Line registering or measuring mechanism.*—The principal function of this mechanism is to indicate to the operator the amount of space represented by the types, spaces, &c., as registered on the record-strip by the action of the punches and to indicate the amount of space remaining unfilled, so that he can determine when and to what extent justification should be resorted to. To accomplish this object, a scale and movable indicator are employed, together with mechanism controlled by the key-levers and operating upon the indicator to cause an advance thereof each time the punches are operated to produce a character or space perforation or perforations, the movement thus produced corresponding in degree with or being proportional to the normal width of the type represented by the selected character or space. The details of this mechanism will best be understood by reference to Figs. 9, 30 to 35, inclusive, and 39 to 41, inclusive.

The line-scale 50, Figs. 1, 2, and 30, is attached to the front plate of the frame in proximity to a horizontal slot 51, in which traverses the indicator 52. The scale is marked to represent proportional parts of the line, the figures running from right to left and the indicator traversing from left to right. This plan is adopted for convenience in adjusting the mechanism for different lengths of line, the indicator being set at the point representing the maximum length, and as the indicator is advanced it subtracts the width of each type recorded, so that the amount of unoccupied space remaining to be filled can be read at once on a scale.

Indicator 52 is attached to the rack-bar 53, guided to reciprocate horizontally in ways formed in a cross-bar 54, the latter detachably secured to the frame. The starting-point for indicator 52 is determined and adjusted by means of a stop-bar 55, Fig. 29, fitted to the ways in which indicator-rack 53 slides and maintained in adjusted position by a pin 56, passing through one of a series of holes 57 in the front plate and cross-bar and entering one of the series of holes in said stop-bar 55. This stop-bar forms an abutment for the end of the rack-bar 53 and limits its movement to the left under the action of the resetting mechanism.

The advancing or measuring movements of the indicator are effected through the medium of a motor-spring 60, acting through a shaft 58 and pinion 59, while the degree or extent of motion is determined or regulated by a series of stop-levers 61, acting through the unit-wheel rack 62 and unit-wheel 63, fast on shaft 58, said stop-levers being in turn controlled by the key-levers and their connections, as will presently appear.

Motor-spring 60 has one end attached to shaft 58 and the opposite end secured to a disk 64, loosely mounted on said shaft and provided with ratchet-teeth engaged by a pawl on the frame for adjusting the initial tension of the spring. The unit-wheel 63 is held normally in adjusted position by means of a locking-pawl 65, pivoted on the frame and provided with a pin adapted to enter between the teeth on said wheel, a spring 66 serving to press said pawl into locking position.

The unit-wheel rack 62 is supported in guides located on the rear face of a pivoted bar 67 and is held normally out of contact with the unit-wheel by the depression of its supporting-bar. A spring 68, connected at one end to the frame and at the opposite end to unit-wheel rack 62, serves to maintain said rack against a stop-pin 69, secured to supporting-bar 67, so that normally the rack 62 occupies a position at the extreme of its movement toward the free end of supporting-bar 67, but is permitted a movement against the action of the spring toward the pivot of said bar. The outer end of supporting-bar 67 is connected by an adjustable link 70 to an arm 71, Figs. 33 and 41, on shaft 72, pivotally supported on the frame and provided with an arm or bail 73, located in front of the series of stop-levers 61, so that when any one of said stop-levers is operated it will turn shaft 72, elevate arm 71, and raise supporting-bar 67 until the teeth of unit-wheel rack 62 are brought into engagement with the teeth of unit-wheel 63. When in this position, unit-wheel rack 62 stands in a plane tangent to the periphery of unit-wheel 63, and in order to insure the proper location of the rack with reference to unit-wheel when in engagement therewith the outer end of supporting-bar 67 plays in a guide 74, which serves as a stop to limit its vertical movement in both directions. The lower arm of locking-pawl 65 stands above and in the path of the supporting-bar 67, carrying unit-wheel rack 62, the arrangement being such that when said bar 67 is depressed to separate the rack from the unit-wheel the locking-pawl will be thrown into engagement, and as the bar is elevated to bring the rack into engagement with the unit-wheel the locking-pawl will be withdrawn from the unit-wheel. The adjustment is such that the withdrawal and engagement of the locking-pawl takes place after the engagement or disengagement of the rack and unit-wheel, so that the latter will be at all times in engagement with the locking pawl or rack or both the locking pawl and rack, this last-named condition existing for an instant both when the locking-pawl is withdrawing and the rack engaging and when the rack is withdrawing and the pawl engaging the unit-wheel.

Units-wheel rack 62 is provided on its rear face with a stop or shoulder 75 for engagement by the stop-levers 61. These latter (in the present instance eleven in number, representing eleven degrees of variation in type widths) are arranged in rear of units-wheel rack 62 and when projected into the path of stop 75 serve to determine the extent of movement imparted to units-wheel rack and units-wheel by spring 60 upon the withdrawal of locking-pawl 65, which takes place when units-wheel rack is elevated into engagement with units-wheel. Each stop-lever is furnished with a blade or wing 76, working in guides 77, Figs. 18, 31, and 32, located in rear of the units-wheel rack 62, the several blades 76 being arranged in sequence on a line parallel with the units-wheel rack, so that when any one of the stop-levers is operated its wing 76 will be thrown forward into the path of stop 75 on units-wheel rack 62 in position to arrest the latter at the point in its movement corresponding with the position of the particular stop-blade operated upon. The several blades 76 of the stop-levers work through bail 73, and the arms carrying said blades contact with the bail and operate to turn shaft 72 whenever one of said stop-levers is actuated to project its blade into the path of the stop on units-wheel rack 62, thereby causing the units-wheel rack to be elevated into engagement with the units-wheel and the locking-pawl be withdrawn from engagement with said wheel.

Upon examination it will be seen that the stop-levers 61 constitute the media through which the movements of the indicator 52 are controlled—that is to say, the parts being in normal position, with the units-wheel held in check by its locking-pawl and the units-wheel rack out of engagement with the units-wheel and held against its stop 69 by spring 68, when any one of the stop-levers is operated to advance its blade 76 into the path of the stop 75 on units-wheel rack it will operate to elevate supporting-bar 67 and bring the units-wheel rack into engagement with the units-wheel and by the continued movement in the same direction will cause the withdrawal of locking-pawl 65 from the units-wheel, thereby permitting the spring 60 to advance the units-wheel. The turning of the units-wheel moves units-wheel rack 62 against the tension of its retracting-spring 68 until arrested by the engagement of stop 75 with the blade 76 of the stop-lever, which serves to inaugurate these movements, thereby measuring the distance through which the indicator 52 is advanced during this operation. The subsequent withdrawal of the stop-lever is accompanied by a corresponding movement of the supporting-bar 67, the latter effecting the withdrawal of the units-wheel rack from engagement with the units-wheel and the reëngagement of the locking-pawl with said wheel, thereby retaining said units-wheel in position of adjustment and permitting the units-wheel rack to return to normal or starting position under the influence of its retracting-spring.

The movements of stop-levers 61 for actuating the indicator of the line-scale are effected and controlled by the key-levers and their connections, as will be hereinafter explained.

*The space-counting mechanism.*—The special office of this mechanism is to indicate the number of justifying space-type occurring in the line, with a view to assisting the operator in ascertaining the proper reading on the justifying-indicator. Hence it is rendered responsive to that portion or portions of the keyboard mechanism and its attachments which control the punch or punches representing the justifying space-type. The details of the mechanism are best seen in Figs. 31, 33, 36, and 37 and its location in Figs. 1 and 2.

Upon cross-bar 54 is mounted a shaft 80, carrying a numbered disk 81 and ratchet-wheel 82. The numbered disk is visible through the aperture 83 in the front plate of the frame, and it is advanced one number at a time by means of an arm 84, carrying pawl 85, the latter held in engagement with the ratchet-wheel by a spring, while a holding-pawl 86, pivotally supported on the frame and engaging the ratchet-wheel, serves to maintain it in the position to which it is carried by actuating-pawl 85 when arm 84 is depressed. The forward or advancing movement of the disk is performed in opposition to the pressure of a spring 87, having one end attached to shaft 80 and the opposite end to a pin on the frame. This spring, in connection with a cam-plate 88, pivotally supported on the shaft and provided with cams 89 in position to engage pins 90 on pawls 85 86, Fig. 37, forms part of the resetting mechanism for returning the machine to zero or starting-point at the completion of a line.

It will be apparent that by connecting arm 84 with those parts of the key mechanism that control the justifying-space punches the total number of spaces occurring in the line will be indicated by the figure appearing through aperture 83.

*The justifying-indicator.*—The dial 95 of the justification-indicator is detachably secured to the front plate of the machine, and with it coöperates the index-hand 96, the markings and manner of using these elements being substantially as explained in my before-mentioned patent, No. 590,763, and hence do not require extended description here, it being sufficient for present purposes to say that as the end of the line is approached index-hand 96 sweeps across dial 95, and when it is ascertained that no further characters can be supplied in the line and it becomes necessary to form the justification-perforations required to effect an enlargement of the space-types sufficient to fill out or justify the line the operator takes note of the figure on the dial opposite the figure on the index-hand corresponding with the number of space-type indicated by disk 81 and proceeds to form the necessary justification-perforations.

In the present machine the index-hand 96 is secured to shaft 58 of the line-measuring devices, so that its movements correspond with those of the units-wheel 63. Inasmuch as justification is required to be performed only at or near the end of the line, the dial 95, containing the justification indicia or table, need not be a complete circle, but may be made in segmental form, as shown in the drawings, and the index-hand may be permitted to make one or more complete revolutions without in any way interfering with the performance of its functions in indicating justification.

*The resetting mechanism.*—Before proceeding to explain the keyboard mechanism it will be convenient to refer to the resetting mechanism, the function of which is to rewind and thus restore the power of springs 26 and 31 of the paper feeding and winding devices, to retract indicator 52 to its zero or normal position and instantly rewind and restore the power of spring 60, to release the indicator of space-counter and permit its spring 87 to return it to normal or zero position, and to operate galley-punch 45 and form the galley-hole in the perforated strip, which hole marks the termination of a line.

First, as to the rewinding of the motor-springs for the paper feed and winding spool: Supported in bearings on the frame 3 is a shaft 100, carrying an arm 101, Figs. 1, 11, and 27. Loosely mounted on said shaft are two gear-wheels 102, one of said gear-wheels meshing with pinion 24 on clutch-section of shaft 8, while the other gear-wheel is connected through a train of gears 103 with pinion-sleeves 28 of the winding-spool mechanism. Each gear 102 is provided with a pin 104, projecting into the plane of movement of arm 101. Both wheels 102 being loose on their shaft are at liberty to follow the movements of the paper feeding and winding devices as effected through the instrumentality of their respective motor-springs; but when at the completion of a line shaft 100 is given a partial rotation its arm 101 by engaging pins 104 will move gear-wheels 102 back to normal or starting position, carrying with them sleeves 23 and 28. Were it not for the clutch-sections connected with these sleeves and their respective shafts the motion would be communicated to the winding-spool and pin-wheels; but this is avoided by providing the clutch-sections with inclined or ratchet teeth, so that they will force back the respective opposing clutch-sections against the light pressure of their springs and cause the motion to be transmitted to the sleeves only, thereby rewinding and restoring the power of the springs. On the end of shaft 100 is secured a pinion 105, which is engaged by a rack 106, the latter attached through a yielding connection 107 to a hand-lever 108, pivotally attached to the frame of the machine and provided with a retracting-spring 109. The yielding connection 107 is interposed between the hand-lever and the rack 106 to prevent injury to the mechanism through carelessness or inattention on the part of the operator, and it consists in the present instance of two sections 110 111, (see Fig. 6,) sliding one within the other, with an interposed spring 112, said spring surrounding hollow section 111 and bearing at one end against a collar on said section and at the opposite end against the pin 113, carried by section 110.

Next, as to the means for resetting the indicator 52 and index-hand 96: Supported to reciprocate horizontally in guides on the rear of cross-bar 54 is the resetting-bar 120, Figs. 9, 13, and 31 to 35, inclusive. This bar receives motion from teeth 121, formed on the side of rack-bar 106, said teeth meshing in a pinion 122, fast to a pinion 123, the latter engaging a rack 124 on the upper edge of the resetting-bar 120. When in normal position—that is, when the hand-lever 108 is free and rack-bar 106 is elevated—the resetting-bar 120 occupies the position indicated in Fig. 35. Pivotally supported upon cross-bar 54 in proximity to units-wheel 63 is a pawl 125. This pawl has an inclined end and a retaining-shoulder, the latter adapted to engage any one of a series of pins 126, attached to the side of units-wheel 63. A spring 127 operates upon said pawl 125 in a direction to cause its engagement with the pins on units-wheel, while a pin 128 on resetting-bar 120 operates, when the resetting-bar is in normal position or retracted, to hold said pawl up or away from and out of contact with the units-wheel. The moment the resetting-bar begins its movement the pawl 125 is thrown by its spring into engagement with one of the pins on the units-wheel, thus locking the latter and preventing rotation under the influence of its motor-spring 60.

The lever 129, pivoted on the cross-bar, has one arm normally in contact with a pin 130, carried by the resetting-bar, while the other end of said lever is connected by a link 131 with the cam-plate 88, which controls the driving and holding pawls 85 86 of the space-indicating mechanism. A spring 132 is connected to lever 129 and operates to hold said lever against the pin 130, and when said pin is withdrawn it actuates cam-plate 88, thereby throwing pawls 85 86 free from ratchet-wheel 82. Said lever 129 also engages a pin 133 on the locking-pawl 65 for the units-wheel. It will be seen, therefore, that when the resetting-bar 120 is retracted or in normal position it operates to hold locking-pawl 125 out of engagement with the units-wheel and at the same time to hold lever 129 in such position that pawls 85 86 may engage their ratchet-wheel and locking-pawl 65 may engage the units-wheel; but the moment the resetting-bar is moved from normal position pawl 125 will be thrown by its spring into position to engage and hold the units-wheel and lever 129 will be moved by its spring to disengage pawls 85 86, thereby permitting spring 87 to return numbered disk 81 to zero and withdrawing locking-pawl 65, and thus remove units-wheel from its control. Having thus relieved the units-wheel from the control of its regular locking devices, the next operation is to turn said units-wheel back to zero position, thereby restoring the line-indicator and index-hand of justifying mechanism to the starting-point. This is accomplished through the medium of a projection or arm 134, carried by the resetting-bar and adapted to engage the end of the indicator-rack 53, which latter, engaging the pinion on the units-wheel shaft, will thus communicate motion to said shaft and rewind or restore its motor-spring 60. The return motion of the units-wheel against the pressure of its spring causes the pins 126 to engage the beveled or inclined face of pawl 125, thus raising and readily passing said pawl; but should the movement of the resetting-bar be interrupted said pawl 125 would immediately engage one of the pins on the units-wheel and lock the latter. The return of the resetting-bar 120 to normal position will again elevate locking-pawl 125, release locking-pawl 65 and pawls 85 86, and remove projection 134 to such distance beyond the end of rack 53 as will permit of the required movement of the latter in measuring off the next succeeding line.

As before stated, the resetting of the various devices effects the punching of the galley-hole. For this purpose shaft 100 is furnished with a cam 135, Figs. 1, 2, 9, and 37, in position to engage one arm of lever 47, carrying a galley-punch 45. When the shaft 100 is in normal position, with the hand-lever free, the arm of galley-punch lever 47 engages the depressed face of cam 135, with the punch retracted. When the shaft is rotated to operate the resetting devices, lever 47 is acted upon by the cam to elevate the punch and form the galley-hole in the strip and at the same time operate upon bell-crank lever 17 of the escapement to shift the pawls and effect a feed movement of the paper upon the return of the shaft 100 to normal position and the withdrawal of galley-punch 45.

*Keyboard mechanism.*—It will be remembered that the feeding mechanism is controlled through bell-crank lever 17, that the punches attached to bars 46 are controlled by the movements of the latter, that the line-scale and justification-index are controlled by the series of stop-levers 61, and that the space-counter is actuated through arm 84, carrying pawl 85. It is the office of the keyboard mechanism to produce and control the movements necessary for actuating these several parts.

Owing to the large number of characters which go to make up a full font of type and the correspondingly numerous key-levers required for effecting punchings in the record-strip representing each separate type and space, one of the problems presented and solved by the present invention is to so construct and arrange the actuating devices, including key-levers, that they will be contained within a comparatively small compass and rendered effective.

The arrangement of the keys pertaining to the keyboard follows that adopted for the matrices of the casting-machine, which latter by the movement of the die-case or matrix-carrier in two directions serves to center each matrix above the mold.

By reference to Fig. 3 it will be seen that the keys 140 are arranged in parallel rows and vertical columns, there being eleven columns and eleven rows, not counting the keys in the last row and omitting also the column to the right bearing the numbers "1" to "12," inclusive, these last-named keys serving for justification and not representing characters. The first column on the left represents type of the same body width setwise—say .035 of an inch—the second column represents types of the next larger dimensions—say .042 of an inch—and so on, each succeeding column, counting toward the right, representing types .007 of an inch wider than those of the next preceding column, the last or eleventh column representing type .105 of an inch wide.

The unit of measurement, .007 of an inch, is an arbitrary one and is susceptible of modification to suit varying conditions.

The keys to the left on the bottom line, Fig. 3, are the normal space-keys, and the one at the bottom of the eleventh or right-hand column is for the direct control of the paper-feed independently of any punching operation. Each key 140 is secured to a key-lever 141, pivotally supported in the base 1, and in order that the levers may be made of sufficient width vertically to prevent undue springing or distortion, and at the same time be compactly arranged, instead of locating one directly above the other the levers pertaining to each vertical column of keys are arranged in slightly-different vertical planes, one lever slightly overlapping the next lower lever, as indicated in Figs. 5, 7, and 8. In order to render the keys more readily and conveniently accessible to the operator, the several rows or lines are arranged in different horizontal planes, (see Fig. 8,) which arrangement necessitates the employment of levers differing in length, and with a view to rendering the stroke of all the levers uniform—a condition desired and appreciated by the operator—the pivots 142 are disposed in a slightly-inclined plane, so that each lever will be permitted the same degree of movement and exert the same leverage upon the lifting-bars.

The diagonal arrangement of the levers 141 and the differences in their length have the effect of separating said levers into distinct groups, each group representing one of the vertical columns of keys, or, it may be said, each group of levers corresponding to one column of keys represents types of the same width.

The key-levers are guided at their front and rear ends, and each lever is furnished in rear of its pivot with a reduced or narrowed section 143, Fig. 8ª, such as would be formed by cutting away a portion of the material along one side and edge of the lever, thereby presenting a narrow vertical web and a supporting shoulder or ledge for the reception of the slotted or furcated lower end of the lifting-bar 144. Each key-lever 141 carries one of these lifting-bars 144, the latter being disposed side by side in a compact series, the upper ends being somewhat reduced in width to admit guides 145 between contiguous bars, Fig. 28, without requiring lateral displacement of said bars.

For convenience of description the series of lifting-bars may be considered as divided into groups corresponding to the vertical columns of keys, and said groups have been lettered in Fig. 7 a to m, inclusive, each group representing one column of keys on the keyboard.

The series of lifting-bars 144 are arranged in a vertical plane parallel with and in proximity to the series of punch-bars 46; but being more numerous they extend some distance beyond the ends of the latter.

Located immediately in front of punch-bars 46 and supported at opposite ends in the intermediate frame 2 is a vertical series of horizontal shafts 146, (twenty-four in number,) each carrying a bail or rod 147, occupying a position intermediate punch-bars 46 and lifting-bars 144, said bail or rod extending entirely across the face of the series of lifting-bars 144, Figs. 5 and 7. The tilting shafts 146 are adjustably and detachably supported at their opposite ends upon pivot-screws 148, Fig. 25, and the bails or rods 147, carried by said shafts, serve as the means of communicating motion from any one of the lifting-bars 144 to any one or more of the punch-bars 46, to the bell-crank lever 17 of the feed-controller, to the stop-levers 66 of the line-scale and justifying-index, and to the arm 84 of the space-counter. By reference to Figs. 7, 15, and 33 it will be seen that each punch-bar 46 is provided with two shoulders or projections, standing in the plane of movement of the series of bails or rods 147—to wit, an upper shoulder or projection 149 and a lower shoulder or projection 150. The upper shoulders 149 of the several punch-bars are located in the same horizontal plane immediately below the upper bail or rod 147, so that whenever one of said punch-bars is elevated to produce a perforation in the record-strip it will raise the topmost bail or rod 147. The lower shoulders or projections 150 on the series of punch-bars are arranged in different horizontal planes, each shoulder or projection being located immediately above one of the bails or rods 147, beginning with the third bail or rod of the series counting from the top, so that when any one of the twenty-two bails or rods 147 is elevated it will raise that one of the punch-bars whose shoulder or projection 150 stands immediately above it, and such raising of the punch-bar will in turn elevate the top bail or rod 147 through the agency of upper shoulder 149, as hereinbefore explained. It may here be noted that the topmost bail or rod 147 is connected through adjustable link 48 with the bell-crank lever 17, carrying the escapement-pawls of the paper-feed mechanism, and effects the feeding of the paper whenever one of the punch-bars having been elevated to produce a perforation in the record-strip is retracted, it being borne in mind that the feeding action takes place when the horizontal arm of the bell-crank lever 17 is drawn down after having been elevated.

It is to be noted that the first and second bails or rods 147, counting from the top, do not operate any of the punch-bars, the upper bail being operated by the punch-rods to actuate the paper-feed mechanism, while to the second bail is assigned the function of operating the first of the series of stop-levers 61 or that one producing the minimum movement of the line-gage and justifying-index. This is effected through the instrumentality of a shorter bar 151, Figs. 7, 15, and 16, associated with the punch-bars and occupying a position to the right of the latter, said short bar being provided with a shoulder 152, occupying a position between the first and second bails or rods 147 and provided at its lower end with two pins 153, between which the arm of the first stop-lever is received, so that whenever said short bar 151 is elevated it will operate upon its stop-lever to effect the minimum movement of the line-indicator. Shoulder 152 is wider than shoulders 149 on the punch-bars, so that whenever the second bail 147 is moved to elevate bar 151 said shoulder will cause a corresponding movement of the upper bail, thus operating the paper-feed without directly operating any one of the punches.

There are twenty-one punch-bars and punches employed in this machine, one representing the justifying-perforation for bringing the justifying mechanism into action and the remaining twenty for producing perforations which determine the movements of the die-case of the casting-machine in two directions. There are eleven degrees of movement of the die-case in each direction; but one of these movements in each direction is determined by a fixed stop, and hence requires no perforation. Ten of the punches represent degrees of movement of the die-case in one direction and the remaining ten corresponding degrees of movement in a direction at right angles to the first-named movements, and inasmuch as the matrices of the die-case occupy the relative position of the letter and point keys in Fig. 3 it will be seen that the movements of the die-case in one direction correspond to differences in the widths of the type, whereas the movements in the other direction correspond to the differences in location of types of the same body width. It follows from this arrangement that the ten punches corresponding to groups *b* to *l*, inclusive, of the lifting-bars, Fig. 7, will represent the ten variations in width of the types, the eleventh or smallest width being represented by group *a*, Fig. 7, and finding its equivalent in the adjustment effected through the medium of the second bail or rod 147 and short bar 151. To indicate on the line-scale and justifying-indicator the amount of space assigned to each character or column of characters represented by each of the ten punches referred to, their punch-bars are provided with two pins 154, Figs. 15, 32, and 34, each bar engaging one of the stop-levers 61—that is to say, the punch corresponding to group *b* will engage the stop-bar nearest the one operated by short bar 151, the punch-bar corresponding with group *c* engaging the next stop-bar, and so on throughout the series, the last stop-bar being engaged by the punch corresponding in lateral position with group of lifting-bars *l*. It only remains, therefore, to provide means which upon the elevation of any one of the lifting-bars in group *a* corresponding with the left-hand column of keys, Fig. 3, shall actuate one of the punches for locating the selected character and at the same time raise the second, counting from the top, of the series of bails or rods 47 to register the minimum space in the line, it being understood that but a single punch is required for any one of the characters in group *a*, and upon the elevation of any one of the lifting-bars belonging to groups *b* to *l*, inclusive, to operate two of the punch-bars, one for determining the column and the other the location of the selected type in said column, the elevation of the punch-bar representing column producing through its stop-lever the degree of feed movement of the line-indicator corresponding with the body width of the types assigned to said column. With this end in view each of the lifting-bars, with three exceptions, hereinafter mentioned, is provided with two engaging shoulders or projections 155 and 156, Figs. 7 and 32. By reference to Fig. 7 it will be seen that the upper shoulders 155 on the lifting-bars of group *a* are located directly beneath and in position to engage the second of the series of bails or rods 147, counting from the top, while the lower shoulders 156 of the first eleven lifting-bars, counting from the left, Fig. 7, are arranged in different horizontal and vertical planes in position to engage alternate bails or rods 147—that is to say, the lower shoulder of the first lifting-bar engages the twenty-third bail, the second the twenty-first bail, and so on, the eleventh lifting-rod engaging the third bail. As each of these bails controls one of the punch-bars, it follows that when any one of the keys connected with the first group *a* of lifting-bars is depressed and its lifting-bar elevated one of the punches will be operated and the indicator of the line-gage advances, as before explained. The twelfth lifting-bar has no lower shoulder 156, and hence does not operate one of the punches, although it effects a movement of the line-indicator through its upper shoulder 155. This exception is made because the character or point indicated by the topmost key in the first column, Fig. 3, occupies a position at one corner of the die-case and does not require a perforation for its location. Each group of lifting-bars *b* to *l*, inclusive, is in like manner provided with two series of shoulders 155 and 156; but the series of shoulders 155 instead of engaging the second of the series of bails, counting from the top, which operates upon short bar 151, engage one of the lower bails 147, which latter operates upon one of the punch-bars corresponding with and effecting, through its perforation in the record-strip, the lateral adjustment of the die-case in the casting-machine represented by the width of the selected character. Thus the shoulders 155 of group *b* engage the sixth bail, counting from the top, those of the next group *c* the eighth bail, and so on, each succeeding group engaging the second lower bail. The shoulders 156 of each group *b* to *l*, inclusive, are arranged in different vertical and horizontal planes, as in the case of group *a*, and engage the same series of bails 147. It will be seen, therefore, that when any lifting-bar of the groups *b* to *l*, inclusive, is elevated it will cause the elevation of two of the punch-bars and that one of the two punch-bars thus elevated will be connected with one of the stop-levers 61—to wit, that stop-lever and punch corresponding to the particular group *b* to *l*, inclusive, of which the particular lifting-bar thus elevated forms a member.

Referring to Fig. 7, it will be seen that the longest lifting-bar in group *l* corresponding to the paper-feed key, Fig. 3, is provided with but one shoulder 155, the latter engaging the first or topmost bail 147. This arrangement is adopted in order to enable the operator to actuate the paper-feed directly without bringing into action any of the punches or their connecting devices.

There remains to be considered the last group of lifting-bars *m* or that pertaining to the justification-keys. These bars (twelve in number) are each, with the exception of the last or shortest one, furnished with two shoulders 155 and 156. Each lifting-bar has a shoulder 155 in position to engage the fourth of the series of bails 147, said bail engaging with one of the series of punches which produces the perforation for bringing into action the justifying mechanism of the casting-machine, so that said punch will be operated each time any one of the series of justifying-keys is depressed. The other shoulders 156 are arranged in different vertical and horizontal planes, so that each will engage one of the bails 147, controlling each one of the series of punches employed for determining the particular character in any given column, or, in other words, the throw of the die-case and its actuating mechanism in one of the two directions of movement for centering the matrices. Two perforations are thus produced in the record-strip, the one for bringing the justifying mechanism into action and the other for determining the degree of adjustment to be effected by said mechanism; but inasmuch as the keys belonging to this series of lifting-bars are only brought into action when the line-gage and justifying-index show that no more characters are to be inserted in the line they are not connected with those of the series of punches which control the line-indicator.

The punch for designating the space-types, irrespective of width, the latter being governed by the shoulders 155 in the group of lifting-bars with which the space-key is connected, is operated upon by next to the last of the series of bails 147, and the latter is in turn engaged by four of the shoulders 156—to wit, those pertaining to the four blank keys in the bottom row, Fig. 3. The tilting shaft 146, carrying this bail, is provided with an arm 157, Fig. 33, whose outer end is connected by a link 158 with arm 84 of the space-counter, so that whenever any one of these space-keys is operated the counter will be actuated to register the fact.

*Operation.*—It should be borne in mind that the record-strip which this machine is designed to produce is fed to the type-making machine in the reverse order to that in which it is punched—that is to say, the perforations representing the characters, points, and spaces of a line are formed in the order of composition and are succeeded by justification-perforations pertaining to the line and a galley-perforation, so that when delivered to the type-making machine in reverse order the galley-perforation will precede the justification-perforations and the latter be followed by the last character, point, or space of the line, and so on until the initial character, point, or space of the line is reached. The depression of any key in the first line corresponding to character, point, or space, counting from the left, will raise one of the group of lifting-bars *a*, and through bails 147 communicate motion to one of the series of punches disconnected from the series of stop-levers 61, at the same time actuating the first stop-bar through short bar 151 and the paper-feed. This will produce a single perforation in the record-strip an advance of the line-indicator a distance corresponding to the width of the type or space, followed by a feeding movement of the paper strip preliminary to the formation of the next perforation. In like manner the depression of any key in one of the other columns will elevate two punches, of which one will be connected to the stop-lever corresponding to the width represented by the column in which the key is located, thereby producing the proper movement of the line-indicator, followed by a feeding movement of the paper strip. Each letter, point, and space will thus be recorded on the record-strip and registered on the line-indicating mechanism, and in the case of a space-type the space-counter will be operated, a feeding movement of the paper being effected between successive operations of the punches. When all the characters and spaces that can properly be accommodated have been impressed upon the record-strip by the punches, the operator ascertains from the justifying-index which one of the justifying-keys should be operated to effect in the casting-machine a proper justification of the line, and he thereupon presses the appropriate justifying-key, thus operating the justifying-punch and such of the other punches as are required to produce the degree of variation in the width of the space-types to justify or fill out the line. Having completed the line, the operator presses upon the hand-lever to restore the space-counting, line-measuring, and justification-indicating mechanisms to zero position and to rewind the motor-springs for the paper-feed and winding-spool, at the same time operating the galley-punch and forming the galley-hole, the latter belonging properly to the next succeeding series of perforations.

In addition to the visual indicating means provided for informing the operator when the end of a line is being approached an audible signal is employed and set in action automatically when the indicator of the line-gage reaches or is in proximity to the margin allowed for justification. This signal is in the form of a bell 159, Fig. 35, mounted on the cross-bar 54 and provided with a hammer 160, located in the line of movement of a projection on indicator rack-bar 53, so that the latter in its movement will raise the hammer and permit it to fall upon the bell.

Having thus described my invention, what I claim as new, and desire to secure by Letters Patent, is—

1. In a paper-feeding mechanism such as described and in combination with the shaft for actuating the feed-wheels and an escapement mechanism connected therewith, of a movable clutch-section, a sleeved clutch-section a spring for holding said clutch-sections in engagement, and a motor-spring connected at one end to the clutch-sleeve.

2. In combination with the paper-feed shaft, and the escapement mechanism, the motor-spring operating on the shaft through a sleeve and clutch, and a spring-restoring mechanism operating through the sleeve to rewind the motor-spring; substantially as described.

3. In combination with the paper-feeding mechanism provided with a motor and an escapement device, a winding-spool shaft provided with a motor-spring; substantially as described.

4. In combination with a paper-feeding mechanism its escapement and motor-spring, the latter operating through a clutch, of a winding-spool provided with a separate winding-spring and clutch, and a resetting mechanism acting through the clutch-sections to rewind the springs of the feeding mechanism and the winding-spool; substantially as described.

5. The combination with a paper-feeding mechanism provided with an escapement, a motor-spring and a clutch, and a winding-spool provided with a clutch and operating-spring, of two gears connected respectively to one section of each of said clutches, and an arm adapted to engage said gears to turn the clutch-sections and rewind the springs connected therewith, substantially as described.

6. In a perforating-machine provided with a series of key-controlled punches and a paper-feeding mechanism, the latter including a motor-spring and an escapement, of a punch independent of said series, and a shaft controlling said independent punch and connected with the motor-spring for rewinding the latter.

7. In a perforating-machine such as described, the combination with the clutch-section loosely mounted on the shaft of the paper-feeding devices, and the galley-punch and its support, of a shaft provided with a cam engaging the galley-punch support, a wheel loose on said shaft and in gear with the clutch-section, and an arm carried by said shaft for engaging said wheel, whereby, upon turning the shaft, the galley-punch will be operated and the clutch-section turned to rewind the motor-spring; substantially as described.

8. In a perforating mechanism such as described and in combination with the escapement for the paper-feeding devices, the motor-spring, the galley-punch and its lever and devices for operating the said escapement to effect a feeding movement of the paper; of the slotted connection between the escapement-lever and the galley-punch lever, and the cam engaging said last-named lever, whereby the escapement-lever may operate independently of the galley-punch but will be operated whenever the galley-punch is brought into action.

9. The combination, in a paper-perforating mechanism such as described, with the motor-spring of the feed mechanism having a clutch-sleeve connected therewith, and a punch, a shaft provided with a cam for actuating said punch, a wheel engaging the clutch-sleeve, an arm carried by the shaft and operating on said wheel, to rewind the motor-spring, a rack engaging a pinion fast to said shaft and operating mechanism for reciprocating the rack; substantially as described.

10. In a line-measuring mechanism for a perforating-machine such as described, the combination with the units-wheel, its shaft and spring, and the rack-bar engaging a pinion on the units-wheel shaft and carrying the line-indicator, of the units-wheel rack reciprocating in ways on a pivoted supporting-bar, and a locking-pawl for the units-wheel arranged to be withdrawn by the raising of the units-wheel rack so as to unlock the units-wheel and abandon it to the control of the units-wheel rack; substantially as described.

11. In combination with the units-wheel the units-wheel rack, the pivoted support for said rack, and the locking-pawl, of the series of stop-levers operating through intermediate connections to elevate the units-wheel rack, withdraw the locking-pawl and arrest the movement of the units-wheel rack and units-wheel; substantially as described.

12. The combination substantially as described with the units-wheel controlling the indicator; of units-wheel rack provided with a retracting-spring and a pin; the support for said rack pivotally attached at one end to the frame and provided with a guide or way for the rack; a stop-lever for engaging the pin on units-wheel rack, to limit its movement in one direction; and a shaft provided with an arm connected to the units-wheel-rack support for elevating the latter; and a second arm in the path of the stop-lever, whereby, in moving the stop-lever into position to intercept the units-wheel rack, the latter is elevated into engagement with the units-wheel.

13. In combination with the units-wheel, its locking-pawl and the units-wheel rack, the latter movable in ways on a pivoted supporting-bar, of the series of pivoted stop-levers, the shaft provided with a bail through which the stop-levers work and with which they contact to turn the shaft and an arm on said shaft connected by an adjustable link with the units-wheel-rack support; substantially as described.

14. As a means for resetting the indicating mechanism the combination with the units-wheel and the rack-bar geared thereto, of the holding-pawl for engaging the units-wheel when its locking-pawl is withdrawn, the lever for engaging the locking-pawl, and the resetting-bar provided with shoulders or pins for engaging the locking-pawl lever, holding-pawl and the rack-bar; substantially as described.

15. In combination with the units-wheel, its locking-pawl and the rack-bar carrying the line-indicator, the holding-pawl, the spring-actuated lever for engaging the locking-pawl and the resetting-bar provided with three engaging pins or shoulders, the one engaging the holding-pawl another the locking-pawl lever and the third the line-indicator rack-bar; substantially as described.

16. The combination with the actuating and holding pawls of the space-register, of the pivoted cam-plate for throwing said pawls out of engagement, the spring-actuated lever connected to said cam-plate, the resetting-bar and the stop-pin carried by the resetting-bar; substantially as described.

17. In combination with the actuating and holding pawls of the space-counter, the units-wheel of the line-indicator and the locking-pawl for said units-wheel, of the cam-plate engaging the pawls of the space-counter, the spring-actuated lever connected to said cam-plate and adapted to engage the units-wheel-locking pawl, and the resetting-bar provided with a pin or shoulder normally in engagement with said spring-actuated lever; substantially as described.

18. In a registering mechanism for a perforating-machine such as described, the combination of the following elements, to wit: the holding and actuating pawls of the space-counter; the cam-plate for disengaging said pawls; the units-wheel of the line-registering mechanism and the locking-pawl; the spring-actuated holding-pawl for the units-wheel; the spring-actuated lever connected to the cam-plate and operating upon the locking-pawl; and the resetting-bar normally engaging the holding-pawl and spring-actuated lever but releasing those members and permitting their springs to actuate them when the resetting-bar is operated to restore the units-wheel to normal or zero position; substantially as described.

19. In a registering mechanism for a perforating-machine such as described the combination of the following elements, to wit: a line-registering mechanism provided with a units-wheel, motor-spring and locking-pawl; mechanism controlling the movements of the units-wheel including a spring-retracted units-wheel rack mounted upon a support movable toward and from the units-wheel and a series of stop-levers operating mediately upon the units-wheel-rack support and directly upon the units-wheel rack to bring the latter into engagement with the units-wheel, to raise the locking-pawl and to place the units-wheel rack in engagement with the units-wheel; a space-counter provided with a retracting-spring and an impelling and a holding pawl; a holding-pawl for the units-wheel; a cam-plate operating on the pawls of the space-counter; a spring-actuated lever connected to the cam-plate and engaging the units-wheel-locking pawl; and a resetting-bar engaging the units-wheel-holding pawl and the lever connected to the cam-plate; substantially as described.

20. In combination with the units-wheel of the indicating mechanism the tangentially-arranged units-wheel rack mounted in ways upon the pivoted supporting-bar, a retracting-spring connected to said rack, a stop on the supporting-bar against which the rack is held normally by its spring, a spring-actuated locking-pawl for the units-wheel engaged by the units-wheel-rack support, a stop-lever arranged to be projected into the path of a shoulder on the units-wheel rack for arresting the motion of the latter, actuating devices connected to the units-wheel-rack support and operated by the movement of the stop-lever to move the rack into engagement with the units-wheel and simultaneously therewith withdraw the locking-pawl; substantially as described.

21. The combination substantially as described of the following elements, to wit: a paper-feed mechanism provided with a motor-spring, spring-restoring devices for rewinding said spring and an escapement; a shaft for actuating the spring-rewinding devices; a line-measuring mechanism provided with a units-wheel, a motor-spring, a locking-pawl, a rack and stop-levers for controlling the movement of the units-wheel; a holding-pawl for the units-wheel, a resetting-bar operating to release the locking-pawl and permit the engagement of the holding-pawl and return the units-wheel to zero; and a rack-bar for communicating motion to the resetting-bar and rewinding-shaft; substantially as described.

22. In a perforating-machine such as described, the combination of the following elements, to wit: a series of key-operated punches; a paper-feeding mechanism provided with a motor-spring and spring-rewinding devices; a line-measuring indicator provided with a motor and escapement mechanism controlled by the key-levers; a resetting mechanism for the indicating devices and the line-measuring mechanism; a rewinding mechanism for the paper-feed motor; a bar connecting and giving motion to the indicator-resetting mechanism and the rewinding devices of the paper-feed mechanism; and a punch connected with and operated by said rewinding mechanism for the paper-feed motor; substantially as described.

23. In combination with the rack-bar of the line-measuring mechanism, the adjustable stop for fixing the normal or zero position of the indicator, the resetting mechanism for restoring the indicator rack-bar to normal or zero position, devices operating upon the resetting mechanism to retract the indicator, and a lever connected to said resetting devices through a yielding connection; substantially as described.

24. In a keyboard mechanism such as described the combination of a plurality of key-levers of different lengths arranged in vertical series side by side but in different horizontal planes, a series of pivots for said levers arranged in a plane inclined to the vertical and a series of lifting-bars, one for each key-lever arranged side by side in a vertical plane parallel with the axes of the key-levers; substantially as described.

25. In a perforating-machine such as described the combination with a series of punch-bars, each provided with a lifting projection, of a parallel series of lifting or actuating bars each provided with a lifting-shoulder, and a series of rods or bails for communicating motion from the lifting-bars to the punch-bars; substantially as described.

26. In a perforating-machine such as described, the combination of the following elements, to wit: a series of punch-bars located side by side and each provided with two engaging shoulders or projections; a series of rods or bails arranged transversely of the series of punch-bars; a series of lifting-bars parallel with the series of punch-bars and each provided with a plurality of lifting-shoulders located at different points in the length of each bar and a paper-feeding device connected with one of said transverse bars or bails; substantially as described.

27. In a perforating-machine such as described the combination of a vertical series of movable rods or bails, each member of the series occupying a different horizontal plane; a series of vertical punch-bars each provided with a lug or projection engaging one of the horizontal rods or bails; and a series of vertical lifting-bars, each of the latter provided with two engaging shoulders or lugs located at different points in the length of the bar and adapted to engage a plurality of the horizontal rods or bails and thereby actuate a plurality of the punch-bars; substantially as described.

28. In a perforating-machine such as described the combination of the following elements, to wit: the series of parallel punch-bars each of said bars being provided with two engaging shoulders located at different points in the length of the bar; a transverse series of rods or bails; a vertical series of lifting-bars each provided with a plurality of engaging shoulders in position to engage two or more of the transverse bars or bails; a paper-feeding mechanism whose controlling member is connected with one of said transverse bars or bails and a line-measuring device connected and controlled by another one of the series of transverse bars or bails; substantially as described.

29. In a perforating-machine such as described, the combination of the following elements, to wit: a keyboard equipped with a series of keys arranged in lines and columns; a key-lever for each key; a series of vertical lifting-bars, one for each key-lever arranged in groups corresponding to the columns of keys, each lifting-bar being provided with two engaging shoulders located at different points in the length of the bar; a vertical series of horizontal bails or rods; and a series of vertical punch-bars each provided with two engaging shoulders for coöperation with the horizontal bails or rods; a paper-feeding mechanism whose controlling member is connected to one of the horizontal bails or rods; and a line indicating or measuring mechanism provided with a plurality of controlling devices, one of said controlling devices being connected with one of the horizontal bails or rods and the others to certain of the series of punch-bars; substantially as described.

30. In a perforating mechanism such as described, the combination with a paper-feeding mechanism and an indicating mechanism of the following elements, to wit: a plurality of laterally-movable rods or bails arranged in series; a plurality of parallel punch-bars disposed in proximity to but transversely of the series of rods or bails, each punch-bar being provided with two engaging shoulders, one series of engaging shoulders operating in conjunction with one of the rods or bails, while the other series of engaging shoulders are arranged in different planes so that one only will coöperate with each of the series of rods or bails; a connection between the rod or bail which is engaged by shoulders on all of the punch-bars and the actuating or controlling devices of the paper-feeding mechanism; a series of lifting-bars parallel with the punch-bars, and comprising several groups each group furnished with two engaging shoulders for each bar of which shoulders all of one series coöperate with one of the bars or bails, while the other series of shoulders each engage one of the other bars or bails; controlling devices for the indicating mechanism; and connections intermediate the bars or bails and said indicator-controlling mechanism for actuating the latter; substantially as described.

31. In a perforating-machine such as described the combination of the following elements, to wit: a paper-feeding mechanism provided with an escapement device; a series of punches controlled by key-levers through intermediate actuating devices and connected to said escapement for effecting a feed of the paper after the operation of each punch; a line-measuring mechanism also controlled by the key-levers; a resetting mechanism provided with a punch-controlling cam and a punch actuated by said cam and connected with the escapement device of the paper-feed mechanism through a loose connection which permits independent movement of the escapement but brings the latter into action when the cam is rotated to operate the punch; substantially as described.

32. In a feeding mechanism such as described, the combination of the following elements, to wit: a rotary feeding or impelling device, such as feed-wheels, a motor and escapement for said feeding device; a winding-spool; and a separate motor for said winding-spool; substantially as described.

33. In a feeding mechanism such as described, the combination of the following elements, to wit: a rotary feeding member; a motor for said feeding member; an escapement; a winding-spool; a motor for said winding-spool, and rewinding or restoring mechanism connected to both of said motor devices for maintaining them in active condition; substantially as described.

34. In a perforating-machine, such as described, the combination of the following elements, to wit: a series of punches; a series of punch-operating keys; connections for transmitting motion from the keys to the punches; a paper-feed mechanism provided with a motor; and an escapement controlled by the keys and operating to govern the movements of the motor-driven paper-feed mechanism; substantially as described.

TOLBERT LANSTON.

Witnesses:
ALEX. S. STEUART,
J. M. FOWLER, Jr.